US009538553B2

United States Patent
Yoshizawa

(10) Patent No.: US 9,538,553 B2
(45) Date of Patent: Jan. 3, 2017

(54) COMMUNICATION APPARATUS, COMMUNICATION METHOD, COMMUNICATION SYSTEM, AND BASE STATION

(75) Inventor: Atsushi Yoshizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 125 days.

(21) Appl. No.: 14/127,698

(22) PCT Filed: Jun. 25, 2012

(86) PCT No.: PCT/JP2012/066129
§ 371 (c)(1),
(2), (4) Date: Dec. 19, 2013

(87) PCT Pub. No.: WO2013/031354
PCT Pub. Date: Mar. 7, 2013

(65) Prior Publication Data
US 2014/0133424 A1    May 15, 2014

(30) Foreign Application Priority Data
Sep. 2, 2011    (JP) .................................. 2011-191572

(51) Int. Cl.
*H04W 74/08* (2009.01)
*H04L 27/26* (2006.01)
(Continued)

(52) U.S. Cl.
CPC ...... *H04W 74/0833* (2013.01); *H04J 13/0062* (2013.01); *H04J 13/22* (2013.01);
(Continued)

(58) Field of Classification Search
CPC ... H04J 13/0062; H04J 13/22; H04L 27/2613; H04L 5/003; H04L 5/0053; H04W 52/0206; H04W 74/0833
(Continued)

(56) References Cited

U.S. PATENT DOCUMENTS 6,738,638 B1 * 5/2004 Moulsley ...................... 455/517
8,391,223 B2 * 3/2013 Barraclough ....... H04W 74/006
370/329
(Continued)

FOREIGN PATENT DOCUMENTS

EP    1909446 A2    4/2008
EP    2083580 A1    7/2009
(Continued)

OTHER PUBLICATIONS

Extended European Search Report issued on Feb. 27, 2015 in patent application No. 12828498.1.
(Continued)

*Primary Examiner* — Chi H Pham
*Assistant Examiner* — Robert Lopata
(74) *Attorney, Agent, or Firm* — Chip Law Group

(57) ABSTRACT

There is provided a communication apparatus including a signature selection unit that selects one signature from a plurality of signatures, and a preamble generation unit that generates a signature in random access using the preamble selected by the signature selection unit. The signature selection unit selects the signature corresponding to a value of transmission data.

20 Claims, 22 Drawing Sheets

(51) Int. Cl.
*H04J 13/00* (2011.01)
*H04L 5/00* (2006.01)
*H04J 13/22* (2011.01)
*H04W 52/02* (2009.01)

(52) U.S. Cl.
CPC ............ *H04L 5/003* (2013.01); *H04L 5/0053* (2013.01); *H04L 27/2613* (2013.01); *H04W 52/0206* (2013.01)

(58) Field of Classification Search
USPC .......................................... 370/310, 328, 329
See application file for complete search history.

(56) References Cited

U.S. PATENT DOCUMENTS

| | | | | |
|---|---|---|---|---|
| 8,619,682 | B2* | 12/2013 | Park et al. ..................... | 370/329 |
| 8,964,659 | B2* | 2/2015 | Vujcic ................. | H04W 74/002 |
| | | | | 370/329 |
| 2001/0027105 | A1* | 10/2001 | Moulsley et al. ............ | 455/450 |
| 2009/0073944 | A1* | 3/2009 | Jiang ........................ | H04J 11/00 |
| | | | | 370/338 |
| 2009/0316630 | A1* | 12/2009 | Yamada et al. ............... | 370/328 |
| 2009/0316631 | A1* | 12/2009 | Kato et al. .................... | 370/328 |
| 2009/0316646 | A1 | 12/2009 | Kato et al. | |
| 2010/0061298 | A1 | 3/2010 | Kato et al. | |
| 2010/0067498 | A1* | 3/2010 | Lee et al. ..................... | 370/336 |
| 2010/0105405 | A1* | 4/2010 | Vujcic ........................ | 455/452.1 |
| 2010/0118777 | A1* | 5/2010 | Yamada et al. ............... | 370/328 |
| 2010/0173634 | A1* | 7/2010 | Kato et al. ................... | 455/438 |
| 2010/0195636 | A1 | 8/2010 | Nakashima et al. | |
| 2010/0265896 | A1* | 10/2010 | Park et al. .................... | 370/329 |
| 2010/0290407 | A1 | 11/2010 | Uemura | |
| 2012/0002617 | A1* | 1/2012 | Vujcic ........................ | 370/329 |
| 2012/0250644 | A1* | 10/2012 | Sambhwani et al. ......... | 370/329 |
| 2012/0281580 | A1* | 11/2012 | Lee ..................... | H04W 74/008 |
| | | | | 370/252 |
| 2013/0157670 | A1* | 6/2013 | Koskela et al. .............. | 455/450 |
| 2013/0208668 | A1* | 8/2013 | Ramos et al. ................ | 370/329 |
| 2015/0016431 | A1* | 1/2015 | Ranta-Aho ....... | H04W 72/0406 |
| | | | | 370/336 |

FOREIGN PATENT DOCUMENTS

| | | |
|---|---|---|
| JP | 2011-71706 A | 4/2011 |
| WO | WO 2008/026461 A1 | 3/2008 |
| WO | WO 2008/053653 A1 | 5/2008 |
| WO | WO 2009/038074 A1 | 3/2009 |
| WO | 2009/055627 A1 | 4/2009 |

OTHER PUBLICATIONS

International Search Report issued Jul. 17, 2012 in PCT/JP2012/066129.
U.S. Appl. No. 14/127,283, filed Dec. 18, 2013, Yoshizawa.

* cited by examiner

| DATA | SIGNATURE |
|---|---|
| 000000 | SIGNATURE 0 |
| 000001 | SIGNATURE 1 |
| 000010 | SIGNATURE 2 |
| 000011 | SIGNATURE 3 |
| ⋮ | ⋮ |
| 111111 | SIGNATURE 63 |

FIG. 15

| TRANSMISSION DATA | SYSTEM FRAME NUMBER |
|---|---|
| 0000000000 | 0 |
| 0000000001 | 1 |
| 0000000010 | 2 |
| 0000000011 | 3 |
| ⋮ | ⋮ |
| 1111111111 | 1023 |

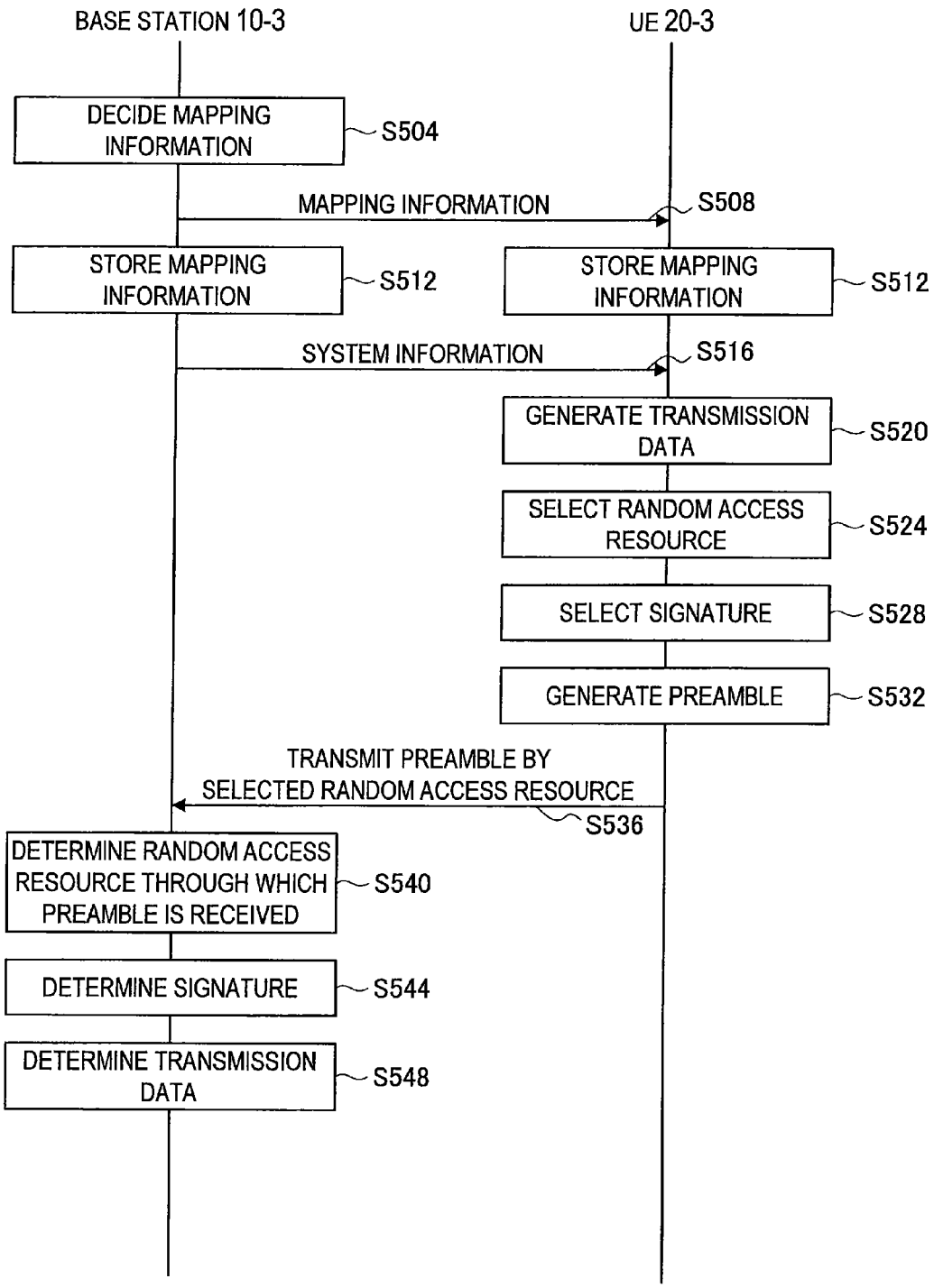

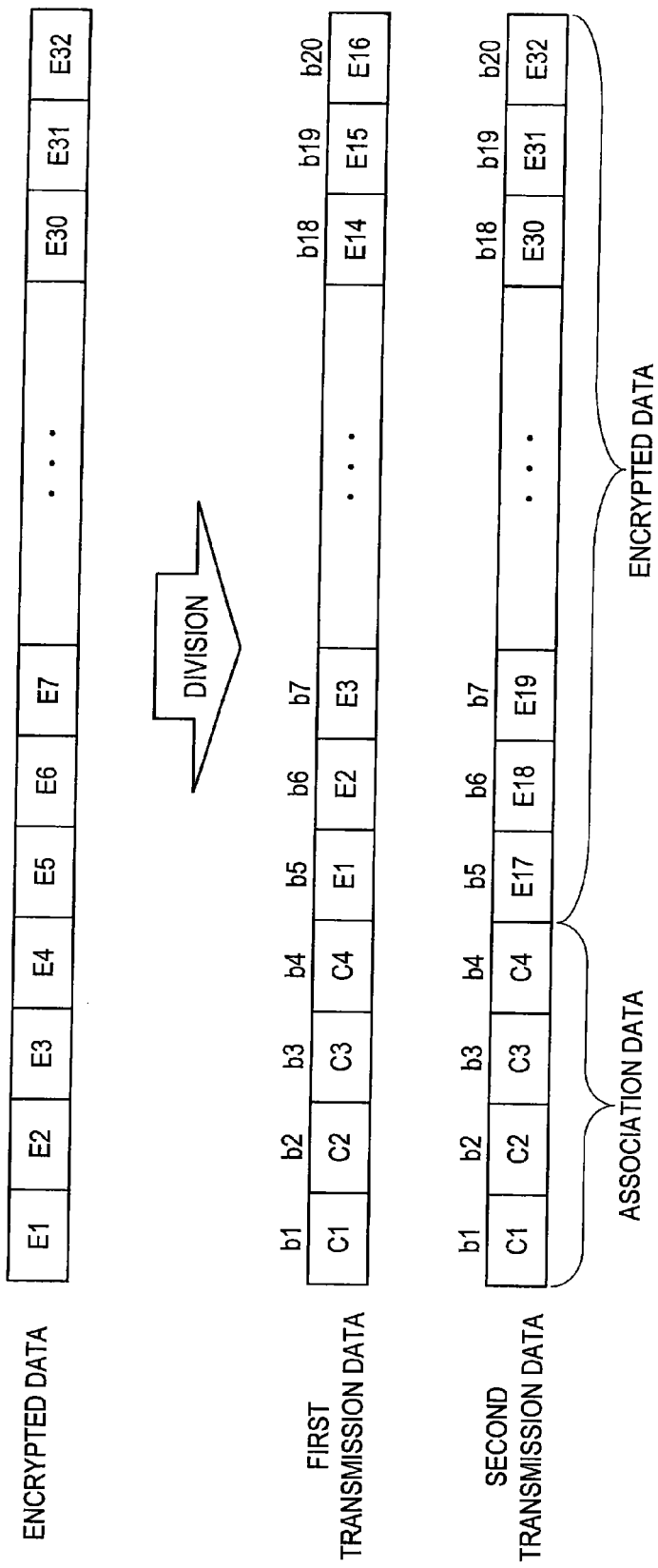

COMMUNICATION APPARATUS, COMMUNICATION METHOD, COMMUNICATION SYSTEM, AND BASE STATION

TECHNICAL FIELD

The present disclosure relates to a communication apparatus, a communication method, a communication system, and a base station.

BACKGROUND ART

Currently, standardization work of the LTE (Long Term Evolution) method as the next-generation communication method and LTE-Advanced (LTE-A), which is an advanced version of the LTE method, is under way in 3GPP (Third Generation Partnership Project). In LTE and LTE-A, various improvements are under discussion to improve the maximum communication speed and quality in cell edges when compared with the 3G method such as the WCDMA method. Accordingly, a new mobile high-speed data communication environment is expected to be provided. For example, the user can comfortably download content of a large amount of information such as Web and animation using a smartphone or the like.

On the other hand, discussions about MTC (Machine Type Communications) are also under way in 3GPP. MTC means is generally synonymous with M2M (Machine to Machine) and means communication between machines that is not directly used by humans. The MTC is mainly carried out between a server and an MTC terminal that is not directly used by humans.

UE including the MTC terminal is generally connected to a base station 10 by executing a procedure called random access with a base station such as eNodeB and can, after being connected to the base station 10, perform data communication with the base station. The random access procedure is described in, for example, Patent Literature 1.

CITATION LIST

Patent Literature

Patent Literature 1: JP 2011-071706A

SUMMARY OF INVENTION

Technical Problem

However, if the random access and data transmission after the random access are performed, corresponding power is consumed. Particularly low power consumption is demanded for the MTC terminal and thus, the reduction of power consumption for data transmission is strongly desired.

The present disclosure proposes a novel and improved communication apparatus, communication method, communication system, and base station to realize data transmission by transmitting a preamble.

Solution to Problem

According to the present disclosure, there is provided a communication apparatus including a signature selection unit that selects one signature from a plurality of signatures, and a preamble generation unit that generates a signature in random access using the preamble selected by the signature selection unit. The signature selection unit selects the signature corresponding to a value of transmission data.

According to the present disclosure, there is provided a communication method including selecting one signature from a plurality of signatures, and generating a preamble in random access by using the selected signature. Selecting the signature includes selecting the signature corresponding to a value of transmission data.

According to the present disclosure, there is provided a communication system including a communication apparatus including a signature selection unit that selects one signature from a plurality of signatures and a preamble generation unit that generates a signature in random access using the preamble selected by the signature selection unit, the signature selection unit selecting the signature corresponding to a value of transmission data. A base station that determines the transmission data based on the signature of the preamble received from the communication apparatus.

According to the present disclosure, there is provided a base station including a receiving unit that receives a preamble from a communication apparatus that generates the preamble in random access using a signature corresponding to a value of transmission data, and a data determination unit that determines the transmission data based on the signature of the preamble.

According to the present disclosure, there is provided a communication method including receiving a preamble from a communication apparatus that generates the preamble in random access using a signature corresponding to a value of transmission data, and determining the transmission data based on the signature of the preamble.

Advantageous Effects of Invention

According to the present disclosure, as described above, data transmission can be realized by transmitting a preamble.

BRIEF DESCRIPTION OF DRAWINGS

FIG. 15 is an explanatory view showing a concrete example of mapping information showing correspondences between data and random access resources.

FIG. 22 is a sequence diagram tidying up operations according to the third embodiment of the present disclosure.

FIG. 23 is an explanatory view showing the division of encrypted data.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

In this specification and the drawings, a plurality of elements that have substantially the same function and structure may be distinguished by attaching different alphabets to the end of the same reference signs. For example, a plurality of configurations having substantially the same function and configuration is distinguished like UE 20A, UE 20B, and UE 20C when necessary. However, if there is no need to specifically distinguish each of a plurality of elements having substantially the same function and configuration, only the same reference sign is attached. For example, if there is no need to specifically distinguish UE 20A, UE 20B, and UE 20C, the configuration is simply called UE 20.

The present disclosure will be described according to the order of items shown below:

1. Overview of Radio Communication System
1-1. Configuration of Radio Communication System
1-2. Frame Configuration
1-3. Random Access
1-4. Background
2. First Embodiment
2-1. Configuration of UE in First Embodiment
2-2. Configuration of Base Station according to First Embodiment
2-3. Operation in First Embodiment
3. Second Embodiment
3-1. Configuration of UE in Second Embodiment
3-2. Configuration of Base Station according to Second Embodiment
3-3. Operation in Second Embodiment
4. Third Embodiment
4-1. Configuration of UE in Third Embodiment
4-2. Configuration of Base Station according to Third Embodiment
4-3. Operation in Third Embodiment
4-4. Modifications
5. Summary 1. Overview of Radio Communication System Technology according to the present disclosure can be embodied, as will be described, as an example, in "2. First Embodiment" to "4. Third Embodiment" in detail, in various forms. UE (communication apparatus) and base stations in each embodiment can realize data transmission by transmitting a preamble. First, an overview of a radio communication system common to each embodiment will be provided below.

1-1. Configuration of Radio Communication System

Figure 1:
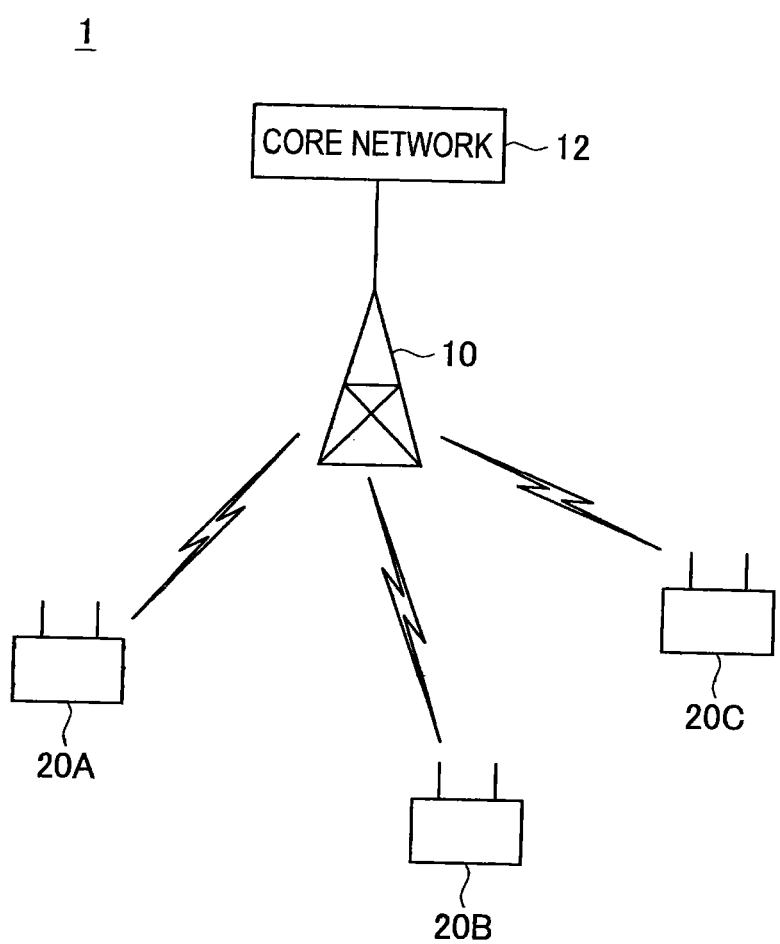
FIG. 1 is an explanatory view showing the configuration of a communication system according to an embodiment of the present disclosure.

FIG. 1 is an explanatory view showing the configuration of a communication system 1 according to an embodiment of the present disclosure. As shown in FIG. 1, the communication system 1 according to an embodiment of the present disclosure includes a base station 10, a core network 12, and UE (User Equipment) 20A to 20C.

The UE 20 is a communication apparatus that performs reception processing in a resource block for down link allocated by the base station 10 and performs transmission processing in a resource block for up link.

The UE 20 may be an information processing apparatus, for example, a smartphone, PC (Personal Computer), home video processing apparatus (DVD recorder, videocassette recorder or the like), PDA (Personal Digital Assistants), home game machine, or household appliance. The UE 20 may also be a mobile communication apparatus such as a mobile phone, mobile music reproducing apparatus, mobile video reproducing apparatus, or mobile game machine.

Further, the UE 20 may be an MTC terminal. The MTC terminal is a radio terminal that is under discussion in 3GPP and customized to MTC as communication between machines without directly being used by humans. For example, a case when the MTC terminal as a medical MTC application collects human electrocardiogram information and transmits the human electrocardiogram information through an up link when a certain trigger condition is satisfied can be considered. As another MTC application, a case when a vending machine is caused to function as an MTC terminal and the MTC terminal transmits inventories and sales of the vending machine can be considered.

Such an MTC terminal generally has, as an example, the following features, but there is no need for each MTC terminal to have all features and which features to have depends on the application.

Almost no movement (Low Mobility)
Small-capacity data transfer (Online Small Data Transmission)
Ultralow power consumption (Extra Low Power Consumption)
Each MTC grouped for handling (Group based MTC Features)

The base station 10 is a radio base station that communicates with the UE 20 contained in coverage. Incidentally, the base station 10 may be eNodeB, a relay node, a femto-cell base station, a pico-cell base station, a remote radio head (RRH) or the like. FIG. 1 shows an example in which only the one base station 10 is connected to the core network 12, but actually a large number of the base stations 10 are connected to the core network 12.

The core network 12 is an operator side network including a management node such as MME (Mobility Management Entity) and serving GW (Gateway). MME is an apparatus that sets or releases a session for data communication and controls handover. MME is connected via interfaces called eNodeB10 and S1. S-GW is an apparatus that routes and transfers user data.

1-2. Frame Configuration

Next, the configuration of a frame shared between the base station 10 and the UE 20 described above.

Figure 2:
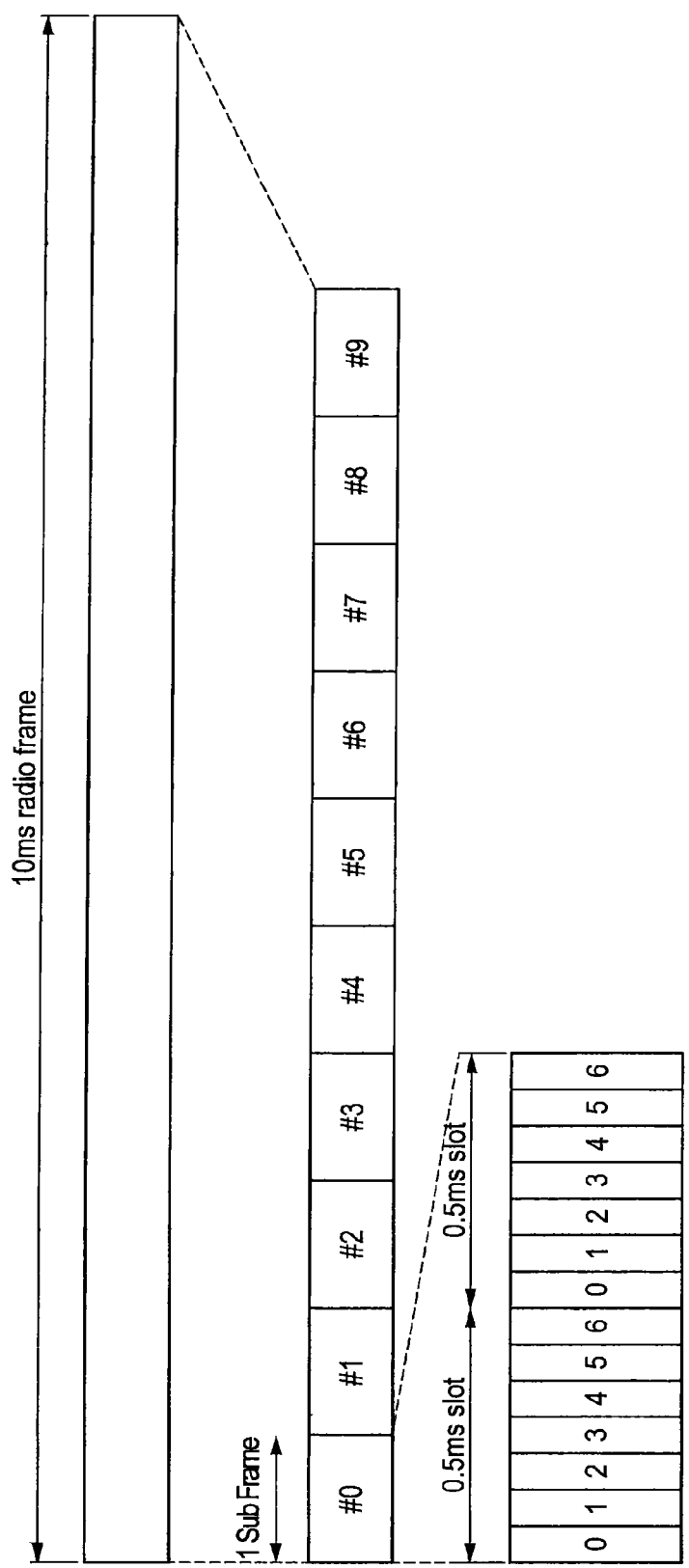
FIG. 2 is an explanatory view showing a frame format.

FIG. 2 is an explanatory view showing a frame format. As shown in FIG. 2, a radio frame of 10 ms is formed of 10 subframes #0 to #9 of 1 ms. Each subframe is made of 14 OFDM (Orthogonal Frequency Division Multiplexing) symbols. One resource block is made of 12 OFDM subcarriers of the subframe length and scheduling is allocated in resource block units. One OFDM symbol is the unit used by a communication method of OFDM modulation method and the unit of outputting data processed by one FFT (Fast Fourier Transform).

Each subframe is made of a control area and a data area. The control area is made of first one to three OFDM symbols and is used to transmit a control signal called PDCCH (Phy DownLink Control Channel). The data area subsequent to the control area is used to transmit user data called PDSCH (Phy DownLink Shared Channel).

1-3. Random Access

The UE 20 performs a series of operations called random access with the base station 10. The random access is performed when, for example, the UE 20 accesses the base station 10 initially from idle mode, handover is started, a request is received from the base station 10, down link data is received when the transmission system is out of synchronism or the like. The technology according to the present disclosure is closely related to the random access and thus, the random access will be described in detail below.

(General Theory of Random Access)

Random access can roughly be divided into a contention type and a non-contention type. The contention type is a method in which a preamble transmitted in the beginning of random access is allowed to compete with other terminals. The non-contention type is a method of communicating a predetermined signature in advance to prevent preamble competition. The signature refers to specific information carried by the preamble.

In the present disclosure, while the random access will be described by mainly assuming contention type random access, instead of the non-contention type random access, the technology according to the present disclosure can also be applied to the non-contention type.

To be able to deal with various cell sizes, four preamble formats 0 to 3 having different preamble lengths are defined for an FDD (frequency multiplexing) system. The preamble length of format 0 is 1 ms, the preamble length of format 1 and format 2 is 2 ms, and the preamble length of format 3 is 3 ms. In the present disclosure, an example in which the preamble has format 0 in the FDD system will mainly be described, but the preamble may have other formats and the technology according to the present disclosure can also be applied to other systems such as a TDD (time multiplexing) system.

Figure 3:
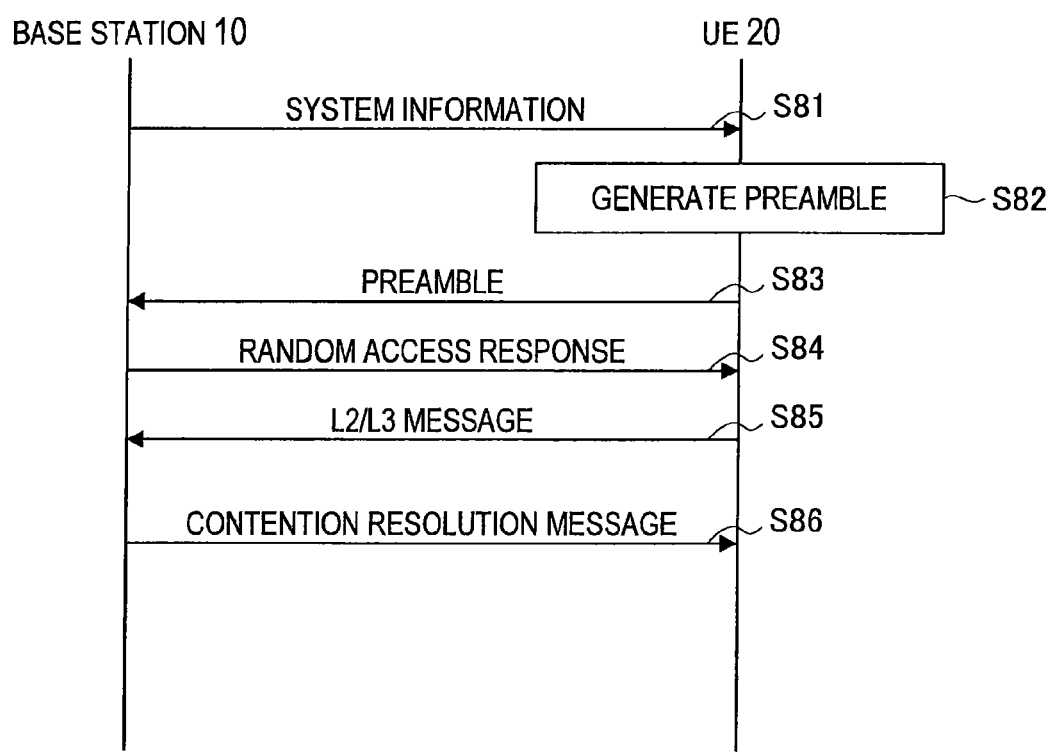
FIG. 3 is a drawing showing a random access procedure by LTE.

A concrete procedure for such random access will be described below with reference to FIG. 3 showing a procedure for random access based on LTE. The procedure described below is a procedure for random access from a certain viewpoint and as will be described in detail in "2. First Embodiment" and thereafter as the embodiments according to the present disclosure, the random access can also be performed by other methods or for other uses.

(Acquisition of System Information)

As shown in FIG. 3, the UE 20 first receives system information from the base station 10 (S81). The system information includes the PRACH configuration index value indicating the temporal arrangement location of the physical layer random access channel (PRACH), a location of the frequency in a system band of PRACH, a width of the frequency of PRACH, a logical route sequence value, and a cyclic shift setting value. The logical route sequence value is used to generate a signature of a preamble and the cyclic shift setting value specifies the distance between signatures.

(Generation of a Preamble)

Subsequently, when a random access request arises, the UE 20 selects one signature from 64 signature candidates generated from the logical route sequence value and the cyclic shift setting value and generates a preamble having the selected signature (S82).

More specifically, the logical route sequence value has a value between 0 and 837 and the UE 20 decides a physical route sequence number from the logical route sequence value using a predetermined mapping table. The mapping table is a table showing a one-to-one correspondence between the logical route sequence value and the physical route sequence number.

Then, the UE 20 generates a Zadoff Chu sequence as a sequence of 839 complex numbers from the physical route sequence number and the cyclic shift setting value according to, for example, the Zadoff Chu sequence generation algorithm. The Zadoff Chu sequence is superior in autocorrelation and cross-correlation features. In addition, an envelope of a transmission signal based on the Zadoff Chu sequence has a fixed amplitude and thus, transmitter distortion by a power amplifier can be reduced. Subsequently, the UE 20 selects one Zadoff Chu sequence from 64 different Zadoff Chu sequences determined from different physical route sequence numbers and cyclic shift setting values. Then, the UE 20 generates a preamble using the Zadoff Chu sequence as a signature.

Figure 4:
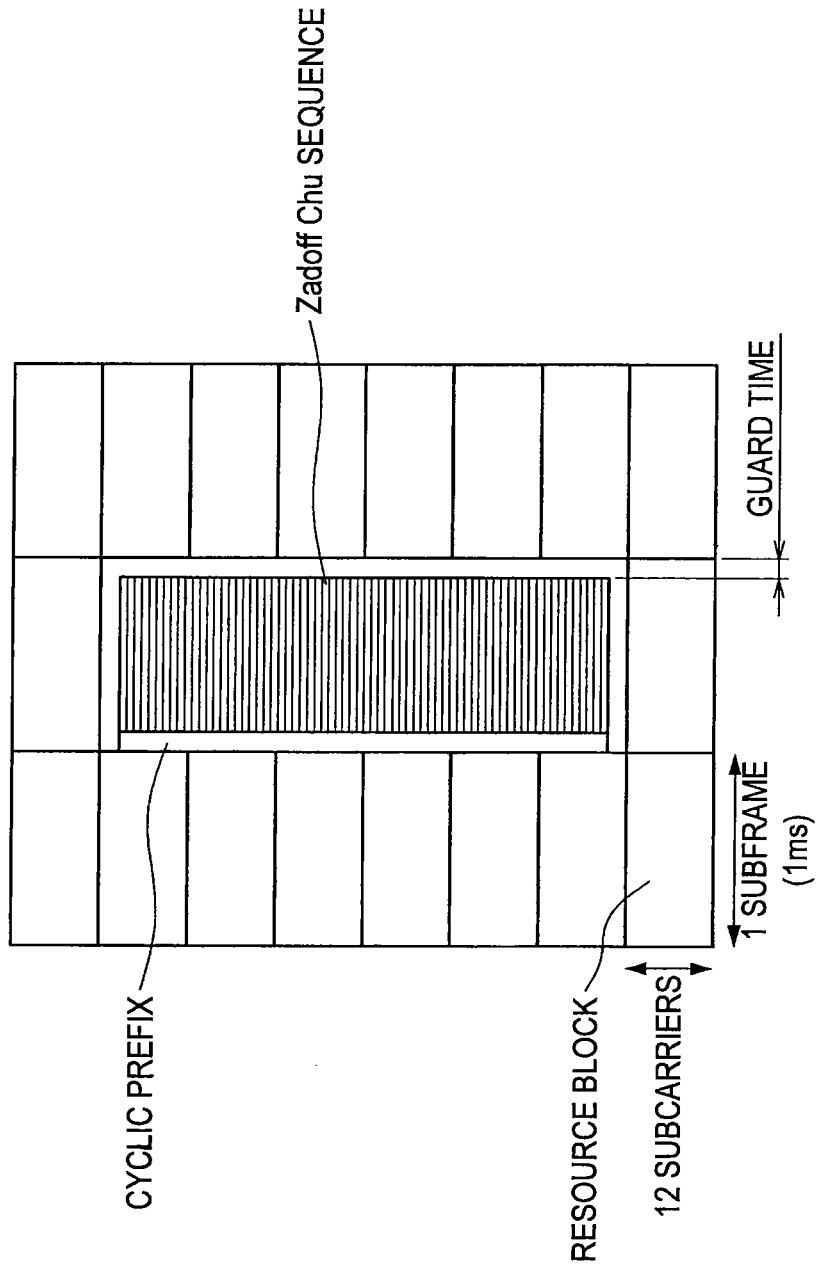
FIG. 4 is an explanatory view showing the concept of a preamble generated by UE in a frequency domain.

FIG. 4 is an explanatory view showing the concept of a preamble generated by UE 20 in a frequency domain. In FIG. 4, a preamble of format 0 is shown. As shown in FIG. 4, the preamble has a cyclic cyclic prefix added to a symbol generated from the Zadoff Chu sequence.

The symbol length of a preamble symbol is 0.8 ms and the cyclic prefix length is about 0.1 ms. Thus, as shown in FIG. 4, a guard time of about 0.1 ms is secured between the end of a preamble symbol and the start end of the next resource block. The guard time is a time provided in consideration of a difference of the time needed between the transmission of a preamble by the UE 20 and the arrival of the preamble in the base station 10 from the UE 20 to the UE 20. The guard time is needed for transmission of a preamble that does not use a timing advance value (TA) and, for transmission of other signals, the UE 20 uses the TA value obtained from a random access response to transmit signals such that time alignment of received signals by the base station is realized.

The signal subcarrier interval of a preamble in format 0 of FDD is 1.25 kHz and thus, as shown in FIG. 4, a band of the 1.08 MHz width corresponding to six resource blocks is occupied for preamble transmission.

(Transmission of a Preamble)

Then, the UE 20 transmits the preamble using, among communication resources (time slots) defined by the PRACH configuration index value, the resource that arrives next (S83).

More specifically, the PRACH configuration index value occupies values between 0 and 63. Of these values, the PRACH configuration index values corresponding to format 0 are 0 to 15. Resources for random access defined by each PRACH configuration index value will be described more concretely below with reference to FIG. 5.

Figure 5:
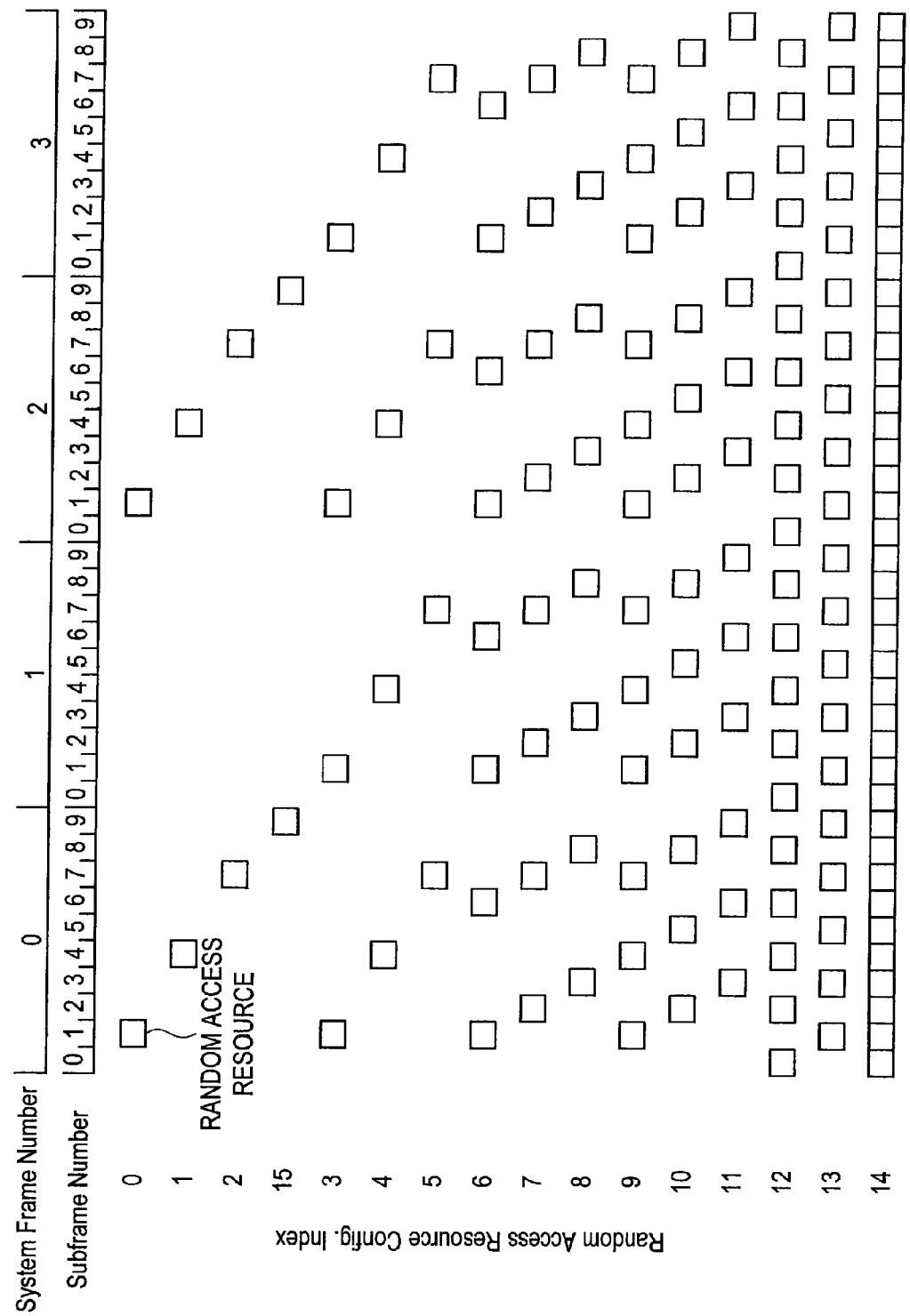
FIG. 5 is an explanatory view showing random access resources defined by each PRACH configuration index value.

FIG. 5 is an explanatory view showing random access resources defined by each PRACH configuration index value. In FIG. 5, SFN (System Frame Number) is a serial number of the radio frame and 0 to 1023 are defined for SFN.

As shown in FIG. 5, random access resources defined by the PRACH configuration index values have different periods and periodic patterns of the offset and the like. For example, the index values "0", "1", "2", and "15" define the resource of one subframe contained in each radio frame whose SFN is even. On the other hand, the index values "3" to "5" define the resource of one subframe contained in each of all radio frames. Similarly, more resources are defined with an increasing index value below. The base station 10 decides the index value based on conditions such as the system band and the number of accommodated users so that random access resources are properly secured and notifies each of the UE 20 in the cell of system information including the index value.

(Random Access Response)

When a preamble is received from the UE 20, the base station 10 acquires a correlation value of the signature (Zadoff Chu sequence) of the received preamble with 64 signatures and can identify the signature of the received preamble from the correlation value. Then, the base station 10 transmits a message called a random access response to the UE 20 through PDCCH (S84).

More specifically, the random access response includes ID of the identified signature of the preamble, the timing advance value (TA) to correct a transmission delay proportional to the distance between the UE 20 and the base station 10, cell radio network temporary ID (C-RNTI) as an identifier of the UE 20, and 20-bit transmission permitted data. If ID of the signature contained in the random access response is correct, the UE 20 recognizes that the preamble transmission is successful. On the other hand, if ID of the signature is not correct, the UE 20 carries out a predetermined procedure for retransmission.

(L2/L3 message)

When a random access response containing the correct ID of a signature is received, the UE 20 transmits an L2/L3 message to the base station 10 (S85). The L2/L3 message includes control messages called layer 2 information/layer 3 information such as an RRC connection request, tracking area update request, and scheduling request, but does not include user data.

(Contention Resolution Message)

When the base station 10 receives an L2/L3 message from the UE 20 and transmits a contention resolution message to the UE 20 (S86), connection between the base station 10 and the UE 20 is established. Then, the UE 20 can perform communication of any user data with the base station 10.

1-4. Background

In the foregoing, an overview of the radio communication system 1 has been provided. Subsequently, prior to a detailed description of each embodiment of the present disclosure, the background leading to each embodiment of the present disclosure will be described.

In the future, terminals like MTC terminals that communicate small-capacity data with extremely low frequency are expected to be widely used. Such terminals are desired to consume low power to minimize battery replacement. Therefore, technical specifications that are significantly different from wider bands and speedup attempted to realize by the conventional LTE method are demanded.

Communication technologies to realize the small-capacity data communication include WLAN (Wireless Local Area Network) specified by IEEE802.11 and the cellular method.

According to WLAN, communication can be performed with the minimum number of packets when data transmission is needed. Accordingly, communication of low power consumption at low bit rate can be realized. However, WLAN is a communication method intended for a relatively small area of normally about 100 m and so the level of difficulty of applying WLAN to uses in which communication in a wide area is needed is high.

On the other hand, the cellular method is superior to WLAN in that a wide area on the order of kilometers can be covered by one cell. For example, in a system in which MTC terminals having a sensor function are arranged over a wide area and the MTC terminals wirelessly transmit sensor data to a base station, small-capacity data communication using the cellular method is considered as a suitable means.

More specifically, according to the WCDMA method (third generation cellular system) as an example of the cellular method, small-capacity data communication can be performed using a random access channel. The random access procedure in the WCDMA method is approximately the same as the aforementioned random access procedure in LTE, but there is a small difference in user message transmission and thus, the random access procedure in the WCDMA method will be described with reference to FIG. 6.

(Random Access in the WCDMA Method)

Figure 6:
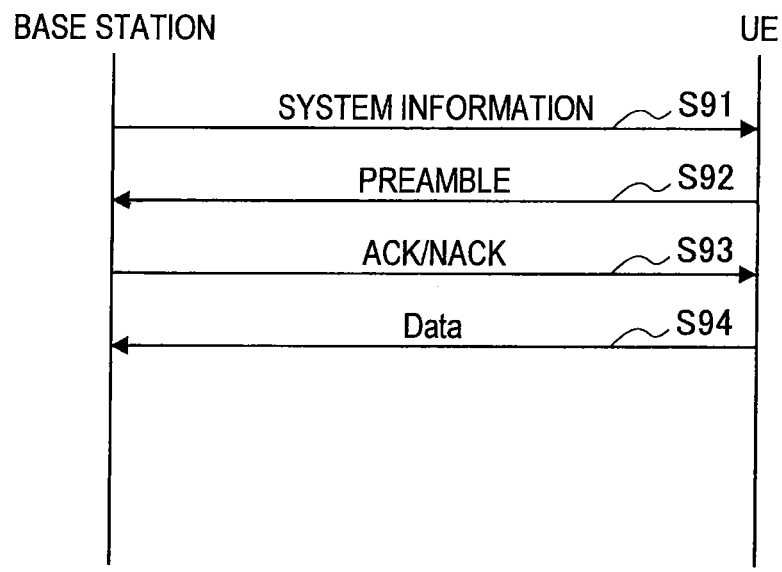
FIG. 6 is a sequence diagram showing the random access procedure in the WCDMA method.

FIG. 6 is a sequence diagram showing the random access procedure in the WCDMA method. First, after basic system information used for random access is communicated from the base station (S91), UE transmits a preamble to the base station (S92).

Subsequently, the base station transmits a PRACH response (ACK/NACK) to the UE using an AICH channel (S93). Then, after verifying ACK through AICH, the UE transmits a UE message to the base station through PUSCH (S94). In WCDMA, UE can transmit user data of about a few hundred bits. When NACK is received, UE retries transmission of the preamble.

(Problems of the WCDMA Method)

In the WCDMA method, as described above, small-capacity data communication can be realized by the random access procedure. However, the cellular method uses the protocol and signal processing that are more complex than those of WLAN and transmission circuits having a large transmission power level and thus, power consumption for the data communication in the WCDMA method is larger than that of WLAN. Therefore, in data communication using the random access procedure in the WCDMA method, obtaining a battery driving time equivalent to that of WLAN is considered to be difficult.

In addition, as a problem of the WCDMA method from another viewpoint, the system migration to the LTE method can be cited. The WCDMA method is a communication method older than the LTE method and thus, the LTE method superior in high speed and system capacity are expected to be adopted for cellular systems that will newly be developed in the future. In addition, cellular systems using the WCDMA method currently in operation are expected to migrate one by one to the LTE method.

Therefore, in consideration of the fact that power consumption of the WCDMA method is large and also the generation thereof as a network, using the WCDMA method is considered not to be the optimal solution to realize small-capacity data communication with low power consumption.

(Discussion of the LTE Method)

In the general random access method in the LTE method described with reference to FIG. 3, transmission of an L2/L3 message subsequent to the preamble is permitted (S85), but transmission of user data is not permitted. Thus, it is difficult for the general random access method in the LTE method to realize small-capacity data communication like the WCDMA method.

Regarding this point, an idea to permit transmission of user data along with transmission of an L2/L3 message also in the LTE method can be considered. In such a case, like the WCDMA method, small-capacity data communication can be realized also in the LTE method. However, if transmission of user data is permitted along with transmission of an L2/L3 message, power consumption at the same level as that of the WCDMA method can be assumed and therefore, like the WCDMA method, it is difficult to secure a sufficient battery driving time.

In addition to the above battery driving time, there is a concern about an overload of RAN (Radio Network). That is, it is known that when a large number of UE start random access at the same time in a cellular system in which an extremely large number of UE exist, the radio interval between the base station and UE is congested, causing extreme degradation in performance. In future cellular systems, an extremely large number of MTC terminals are assumed to be present in a cell and thus, an occurrence of RAN overload is extremely important. Such a concern about the RAN overload is not adequately eliminated by a method of adding user data to an L2/L3 message.

(Significance of the Present Disclosure)

Each embodiment of the present disclosure is made in view of the above circumstances and according to each embodiment of the present disclosure, data transmission can be realized by transmitting a preamble. Accordingly, low power consumption can be realized and also an occurrence of RAN overload can be inhibited. Each embodiment of the present disclosure as described above will successively be described in detail below.

2. First Embodiment

UE 20-1 according to the first embodiment of the present disclosure selects the signature of a preamble in accordance with the value of transmission data. Accordingly, a base station 10-1 having received the preamble can determine transmission data from the signature of the preamble.

2-1. Configuration of UE in First Embodiment

Figure 7:
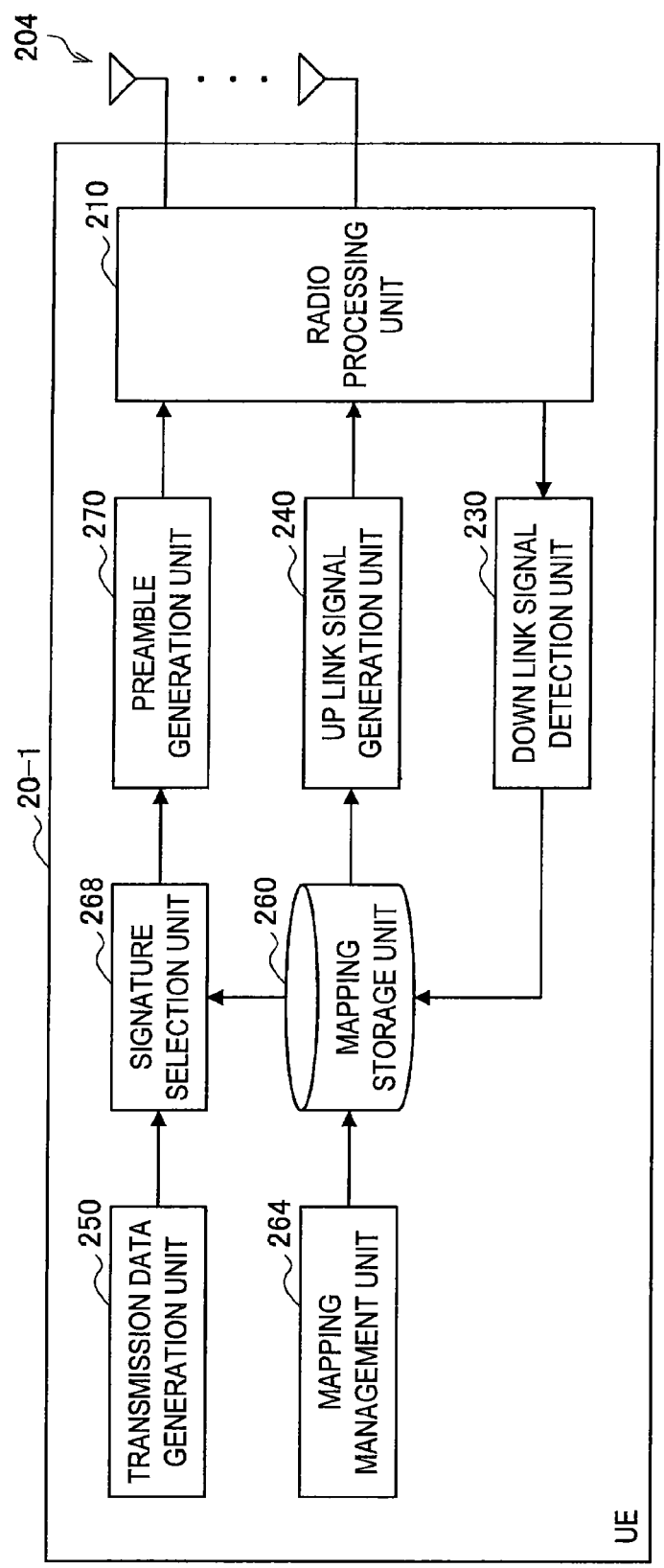
FIG. 7 is a functional block diagram showing the configuration of UE according to a first embodiment of the present disclosure.

FIG. 7 is a functional block diagram showing the configuration of the UE 20-1 according to the first embodiment of the present disclosure. As shown in FIG. 7, the UE 20-1 according to the first embodiment of the present disclosure includes an antenna group 204, a radio processing unit 210, a down link signal detection unit 230, an up link signal detection unit 240, a transmission data generation unit 250, a mapping storage unit 260, a mapping management unit 264, a signature selection unit 268, and a preamble generation unit 270.

The antenna group 204 receives a radio signal from the base station 10-1 and acquires an electric high-frequency signal to supply the high-frequency signal to the radio processing unit 210. The antenna group 204 also transmits a radio signal to the base station 10-1 based on a high-frequency signal supplied from the radio processing unit 210. The UE 20-1 includes the antenna group 204 made of a plurality of antennas and so can perform MIMO communication and diversity communication.

The radio processing unit 210 converts a high-frequency signal supplied from the antenna group 204 into a baseband signal (down link signal) by performing analog processing such as amplification, filtering, and down conversion. The radio processing unit 210 also converts a baseband signal (up link signal) supplied from the up link signal generation unit 240 or the like into a high-frequency signal. Thus, the radio processing unit 210 functions as a transmitting unit and a receiving unit together with the antenna group 204. In addition, the radio processing unit 210 may have a function to make DA conversion of an up link signal and a function to make AD conversion of a down link signal.

The down link signal detection unit 230 detects a control signal such as PDCCH or user data such as PDSCH from a down link signal supplied from the radio processing unit 210. When the base station 10-1 decides/manages mapping information showing correspondences between values of transmission data and signatures, the mapping information may be arranged on PDCCH or PDSCH.

The up link signal generation unit 240 generates an up link signal to be transmitted to the base station 10-1. More specifically, the up link signal generation unit 240 generates a control signal such as PUCCH and a user data signal such as PUSCH. When the UE 20-1 decides/manages mapping information, the up link signal generation unit 240 may arrange the mapping information on PUCCH or PUSCH.

The transmission data generation unit 250 generates transmission data to be transmitted to the base station 10-1. The transmission data includes application data and identification data of the UE 20-1. The transmission data will be described more concretely below with reference to FIG. 8.

Figures 8, 9:
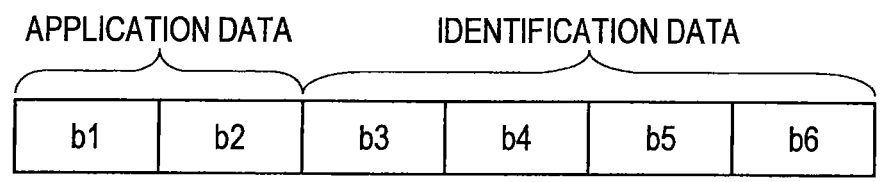
FIG. 8 is an explanatory view showing a concrete example of transmission data.
FIG. 9 is an explanatory view showing a concrete example of mapping information showing correspondences between data and signatures.

FIG. 8 is an explanatory view showing a concrete example of transmission data. As shown in FIG. 8, the transmission data includes, for example, six bits of bit b1 to bit b6 and application data is allocated to bits b1, b2 and identification data is allocated to bits b3 to b6.

The application data is applications possessed by the UE20-1 or data in accordance with the role assumed by the UE 20-1. When, for example, the UE 20-1 is provided in a vending machine to assume the role of reporting conditions of the vending machine and sales, application data may be data showing sales or inventories of the vending machine. More specifically, if the amount of sales per day of the vending machine exceeds a predetermined value, "1" may be set to bit b1 of if the vending machine needs replenishment of merchandize, "1" may be set to bit b2. In addition, the present embodiment can be applied to various applications and thus, various kinds of data can be assumed as application data.

The identification data is data to identify the UE 20-1. The identification data may be ID unique to the UE 20-1, but if enough bits to represent the unique ID are not allocated, the identification data may be local ID that is unique in a cell. In this case, if the base station 10-1 holds correspondences between local ID and unique ID for each of the UE 20-1, the UE 20-1 can be identified based on the identification data. The identification data may also be data indicating the group to which the UE 20-1 belongs. If, for example, the operator wants to know the amount of sales of each section of vending machines, instead of the amount of sales of each vending machine, the above objective can be achieved by the same identification data being used by a group of the UE 20-1 provided in vending machines of the same section.

The mapping storage unit 260 shown in FIG. 7 stores mapping information (first mapping information) showing the correspondences between data and signatures. The mapping information is shared between the base station 10-1 and the UE 20-1. When, for example, the base station 10-1 decides/manages mapping information, mapping information is shared by the mapping information being transmitted to the UE 20-1 by the base station 10-1. Incidentally, a plurality of the UE 20-1 present in the same cell may hold the same mapping information or different mapping information. The mapping information will be described more concretely below with reference to FIG. 9.

FIG. 9 is an explanatory view showing a concrete example of mapping information showing correspondences between data and signatures. As shown in FIG. 9, the mapping information defines a correspondence between each piece of G-bit data "000000" to "111111" and one signature of signature 0 to signature 63. For example, data "000010" is associated with signature 2. Signature 0 to signature 63 are 64 signatures calculated from the logical route sequence value and the cyclic shift setting value communicated from the base station 10-1.

The mapping management unit 264 manages such mapping information. For example, the mapping management unit 264 may decide mapping information or change mapping information when necessary. Data confidentiality can be improved by, for example, changing mapping information periodically.

The signature selection unit 268 selects the signature corresponding to the transmission data generated by the transmission data generation unit 250 based on mapping information stored in the mapping storage unit 260. If the transmission data is, for example, "000010", the signature selection unit 268 selects signature 2 associated with "000010" from 64 signatures calculated from the logical route sequence value and the cyclic shift setting value.

The preamble generation unit 270 generates a preamble using the signature selected by the signature selection unit 268. A detailed configuration of the preamble generation unit 270 will be described below with reference to FIG. 10.

Figure 10:
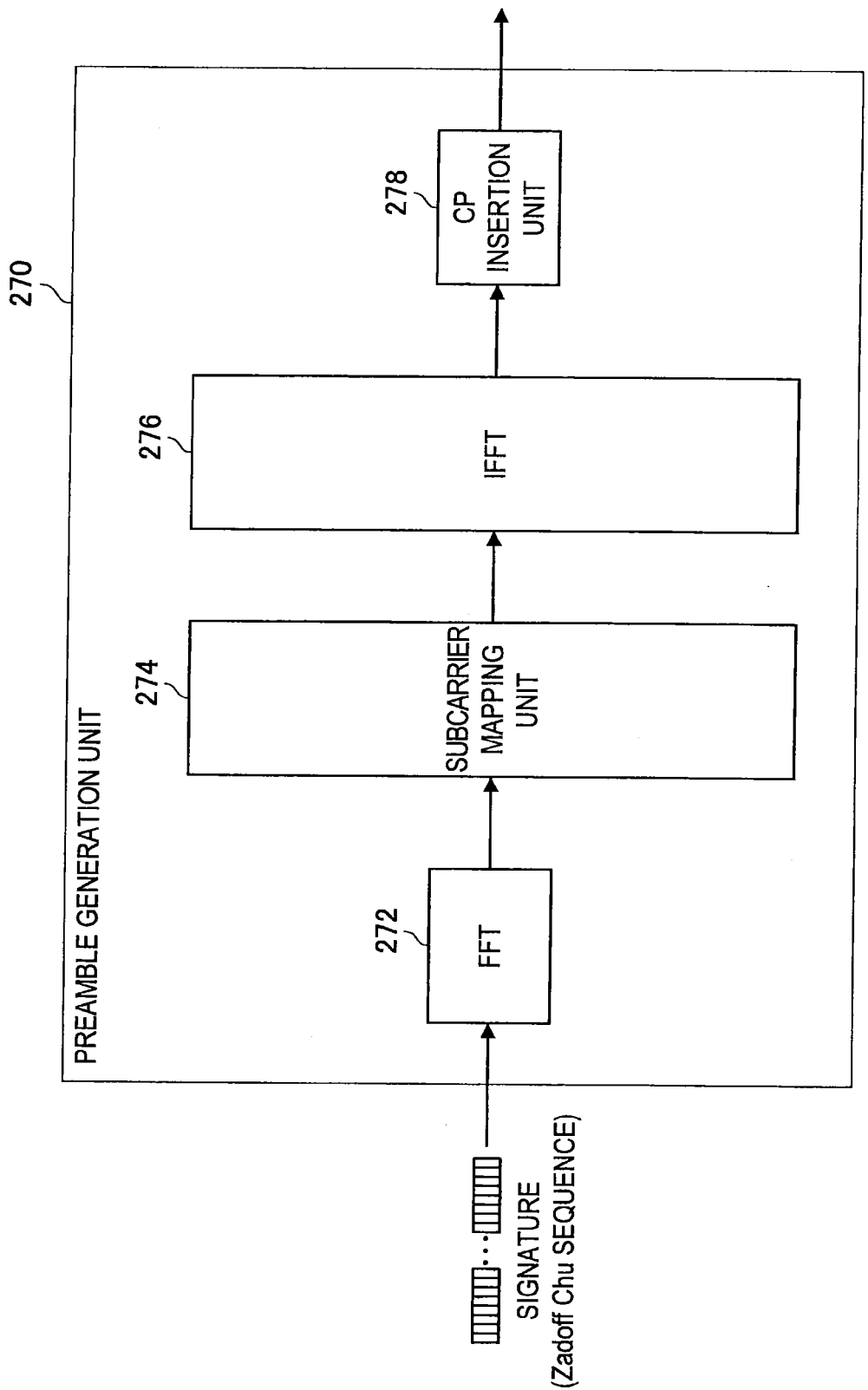
FIG. 10 is an explanatory view showing the configuration of a preamble generation unit.

FIG. 10 is an explanatory view showing the configuration of the preamble generation unit 270. As shown in FIG. 10, the preamble generation unit 270 includes FFT (fast Fourier transform) 272, a subcarrier mapping unit 274, IFFT 276, and a CP insertion unit 278.

The FFT 272 performs a fast Fourier transform of a signature (Zadoff Chu sequence) selected by the signature selection unit 268 and supplied thereto. The subcarrier mapping unit 274 arranges frequency domain data obtained from the FFT 272 on a frequency to be transmitted. The IFFT 276 converts data arranged on the frequency into time-base data. Then, a preamble is generated by a cyclic prefix being added to the time-base data by the CP insertion unit 278.

As described above, the UE 20-1 according to the first embodiment of the present disclosure generates a preamble having the signature corresponding to transmission data and transmits the preamble to the base station 10-1 via the radio processing unit 210 and the antenna group 204. The UE 20-1 may transmit the preamble by, among a plurality of random access resources defined by the PRACH configuration index values, for example, the random access resource that arrives next.

2-2. Configuration of Base Station according to First Embodiment

In the foregoing, the configuration of the UE 20-1 according to the first embodiment of the present disclosure has been described. Subsequently, the configuration of the base station 10-1 according to the first embodiment of the present disclosure will be described with reference to FIG. 11.

Figure 11:
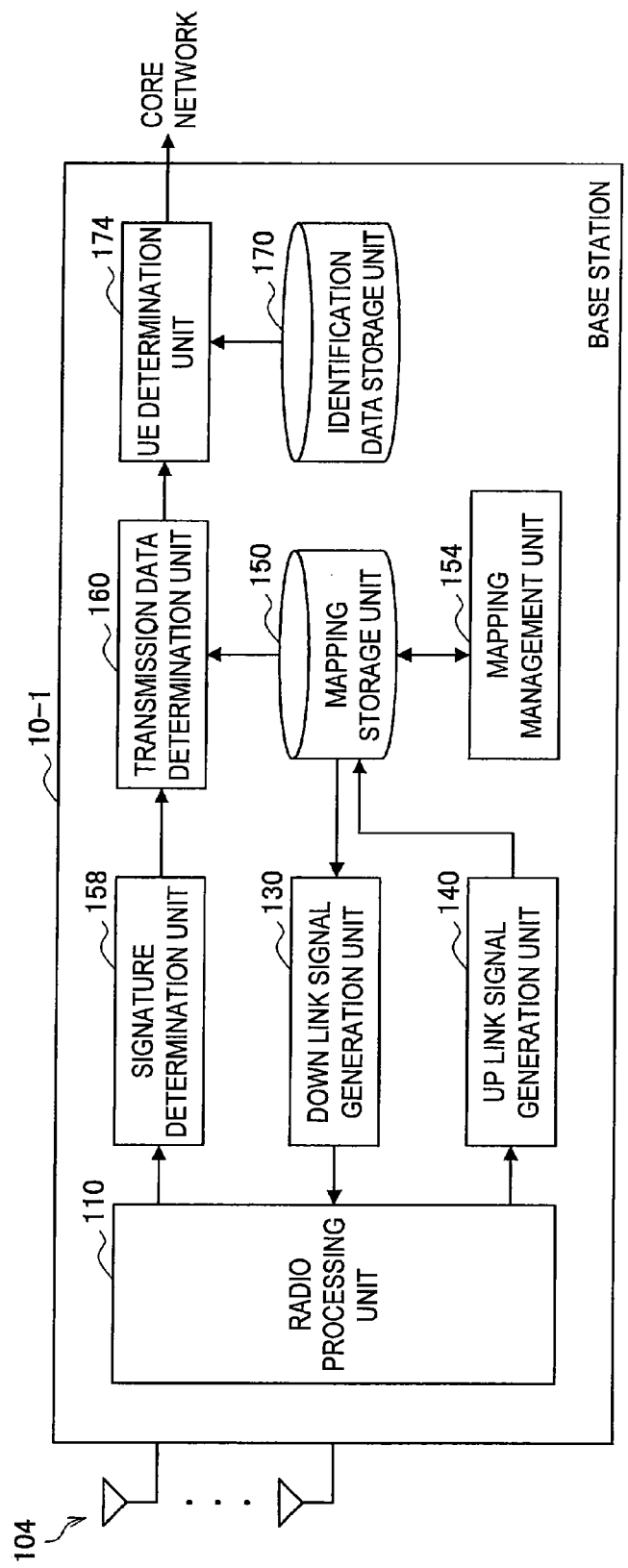
FIG. 11 is a functional block diagram showing the configuration of a base station according to the first embodiment of the present disclosure.

FIG. 11 is a functional block diagram showing the configuration of the base station 10-1 according to the first embodiment of the present disclosure. As shown in FIG. 11, the base station 10-1 according to the first embodiment includes an antenna group 104, a radio processing unit 110, a down link signal generation unit 130, an up link signal detection unit 140, a mapping storage unit 150, a mapping management unit 154, a signature determination unit 158, a transmission data determination unit 160, an identification data storage unit 170, and a UE determination unit 174.

The antenna group 104 receives a radio signal from the UE 20-1 and acquires an electric high-frequency signal to supply the high-frequency signal to the radio processing unit 110. The antenna group 104 also transmits a radio signal to the UE 20-1 based on a high-frequency signal supplied from the radio processing unit 110. The base station 10-1 includes the antenna group 104 made of a plurality of antennas and so can perform MIMO communication and diversity communication.

The radio processing unit 110 converts a high-frequency signal supplied from the antenna group 104 into a baseband signal (up link signal) by performing analog processing such as amplification, filtering, and down conversion. The radio processing unit 110 also converts a baseband signal (down link signal) supplied from the down link signal generation unit 130 or the like into a high-frequency signal. In addition, the radio processing unit 110 may have a function to make DA conversion of a down link signal and a function to make AD conversion of an up link signal.

The down link signal generation unit 130 generates a down link signal to be transmitted from the base station 10-1. More specifically, the down link signal generation unit 130 generates PDCCH, PDSCH and the like. When the base station 10-1 decides/manages mapping information, the down link signal generation unit 130 may arrange the mapping information on PDCCH or PDSCH.

The up link signal detection unit 140 detects a control signal such as PUCCH or user data such as PUSCH from an up link signal supplied from the radio processing unit 110.

The mapping storage unit 150 stores, like the mapping storage unit 260 of the UE 20-1, mapping information showing the correspondences between data and signatures. The mapping information is as described with reference to FIG. 9 and thus, a detailed description thereof here is omitted.

The mapping management unit 154 manages mapping information. For example, the mapping management unit 154 may decide mapping information or change mapping information when necessary. Data confidentiality can be improved by, for example, changing mapping information periodically.

The signature determination unit 158 determines the signature of a preamble received by the radio processing unit 110 from a correlation output value.

The transmission data determination unit 160 determines transmission data corresponding to the signature determined by the signature determination unit 158 based on mapping information stored in the mapping storage unit 150. If, for example, the signature determined by the signature determination unit 158 is signature 2, the transmission data determination unit 160 determines that the transmission data is "000010" based on, for example, mapping information shown in FIG. 9.

The identification data storage unit 170 stores correspondences between local ID and unique ID of each of the UE 20-1. The identification data storage unit 170 may continue to hold identification data of the UE 20-1 once having made the transition to the active mode after the UE 20-1 makes the transition to the idle mode.

The UE determination unit 174 determines the UE 20-1 that has transmitted a preamble from identification data contained in the transmission data determined by the transmission data determination unit 160 by referring to the identification data storage unit 170. Then, the unique ID of the determined UE 20-1 and application data contained in the transmission data are transmitted to the core network 12.

2-3. Operation in First Embodiment

In the foregoing, the configurations of the base station 10-1 and the UE 20-1 according to the first embodiment of the present disclosure have been described. Subsequently, the operation according to the first embodiment of the present disclosure will be described with reference to FIG. 12.

Figure 12:
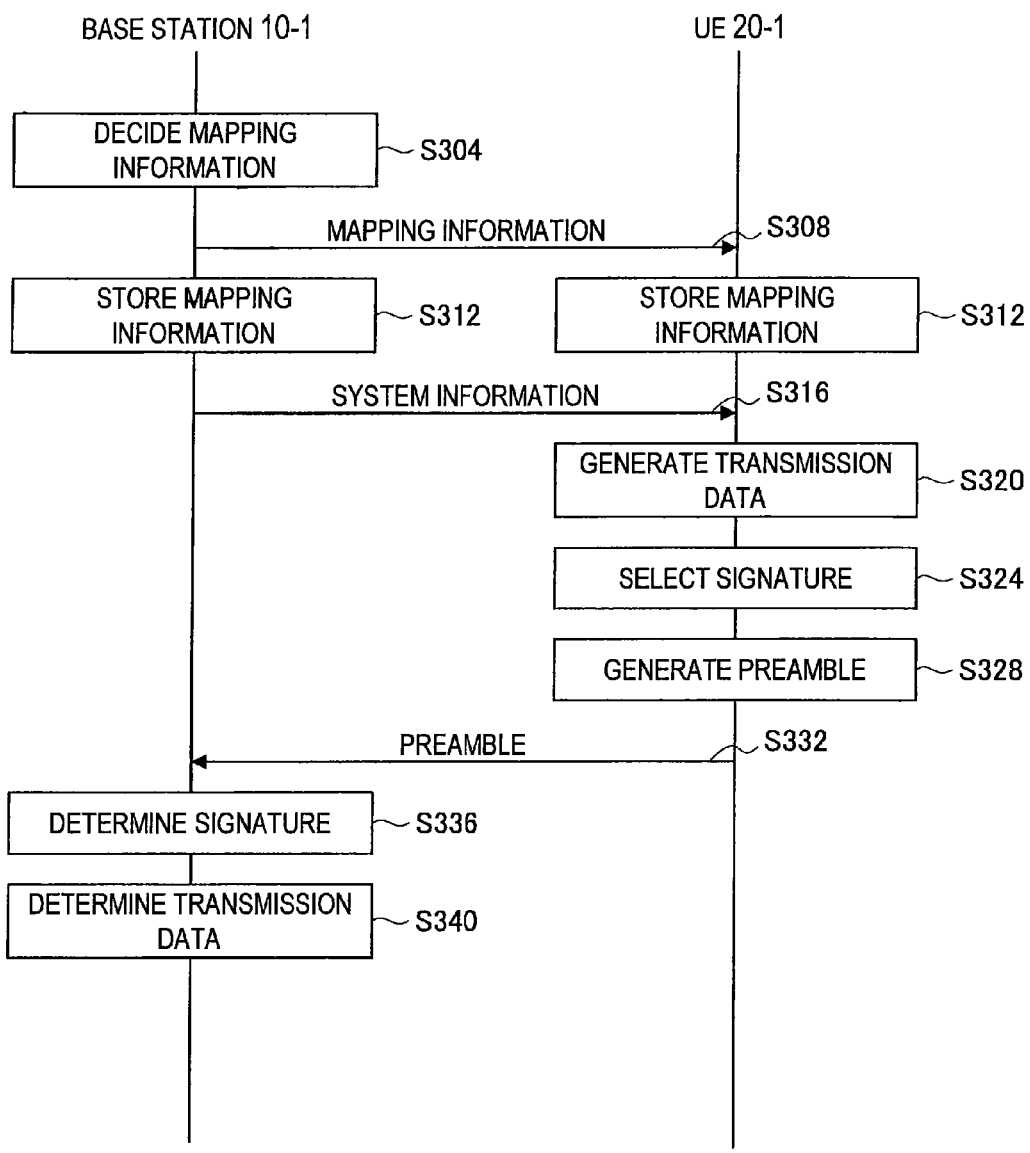
FIG. 12 is a sequence diagram tidying up operations according to the first embodiment of the present disclosure.

FIG. 12 is a sequence diagram tidying up operations according to the first embodiment of the present disclosure. As shown in FIG. 12, when the mapping management unit 154 of the base station 10-1 first decides mapping information (S304), the base station 10-1 signals the decided mapping information to the UE 20-1 (S308). Then, the base station 10-1 and the UE 20-1 store the mapping information in the mapping storage unit 150 and the mapping storage unit 160 respectively (S312).

Then, after the base station 10-1 communicates system information (S316), the transmission data generation unit 250 of the UE 20-1 generates transmission data (S320) and then the signature selection unit 268 selects the signature corresponding to the transmission data (S324). Subsequently, the preamble generation unit 270 generates a preamble having the signature selected by the signature selection unit 268 (S328). Further, the radio processing unit 210 and the antenna group 204 transmit the preamble generated by the preamble generation unit 270 to the base station 10-1 (S332).

On the other hand, when the preamble is received from the UE 20-1, the base station 10-1 determines the signature of the preamble (S336). Then, the transmission data determination unit 160 of the base station 10-1 determines the transmission data corresponding to the determined signature of the preamble based on mapping data (S340). Thereafter, the determined transmission data is transmitted to, for example, a predetermined operator via the core network 12.

If the reception of the preamble is successful, the base station 10-1 may transmit, like the normal random access procedure, a random access response. In this case, the UE 20-1 can recognize that the transmission data has normally been transmitted to the base station 10-1 based on the reception of the random access response from the base station 10-1. On the other hand, after receiving the random access response, the UE 20-1 may not continue with the random access procedure including the transmission of an L2/L3 message. By adopting such a configuration, the UE 20-1 can transmit data to the base station 10-1 only by transmission of a preamble and therefore, power consumption and an occurrence of RAN overload can be inhibited.

The mapping information can be changed when appropriate. This will be described more concretely below with reference to FIG. 13.

Figure 13:
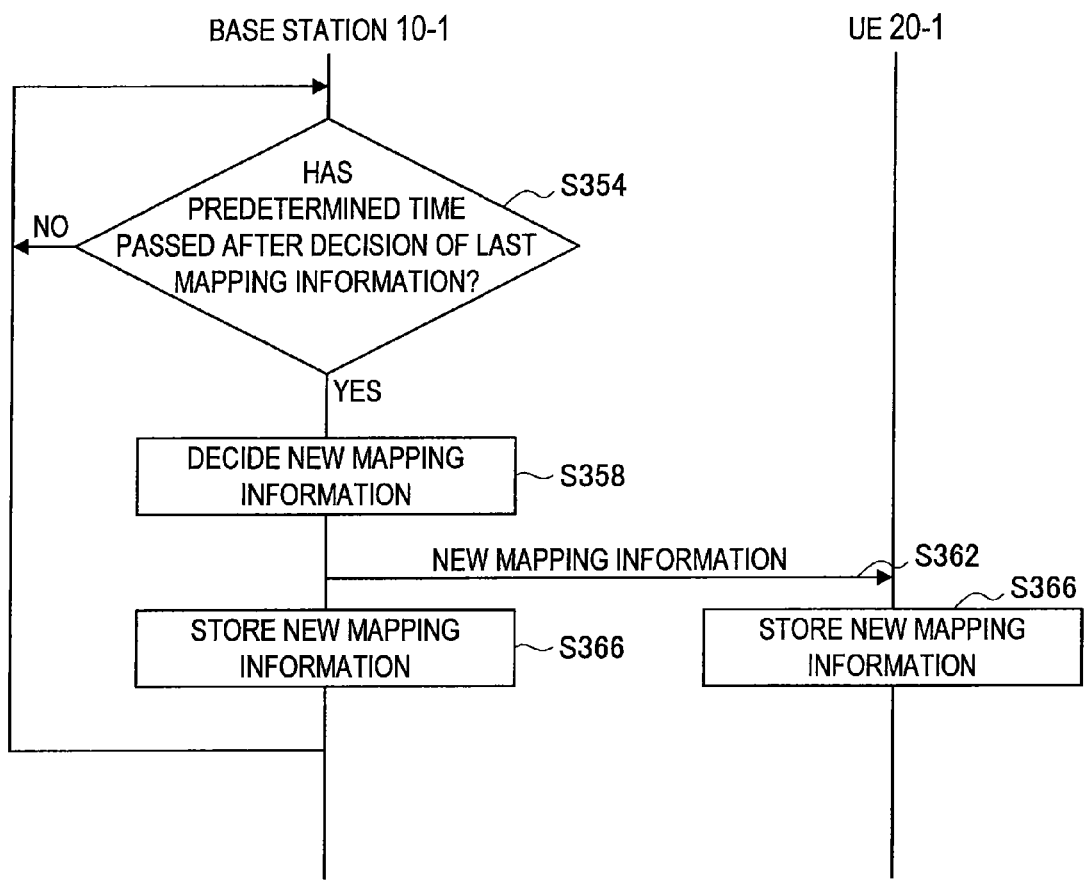
FIG. 13 is an explanatory view showing a change operation of mapping information.

FIG. 13 is an explanatory view showing a change operation of mapping information. As shown in FIG. 13, when a predetermined time passes after the decision of the last mapping information (S354), the mapping management unit 154 of the base station 10-1 decides new mapping information (S358). Then, the base station 10-1 signals the new mapping information to the UE 20-1 (S362) and the base station 10-1 and the UE 20-1 store the mapping information in the mapping storage unit 150 and the mapping storage unit 160 respectively (S366).

FIG. 13 shows an example of changing mapping information based on an elapsed predetermined time, but the mapping management unit 154 may change the mapping information based on, for example, a request from the UE 20-1. FIG. 13 also shows an example in which mapping information is changed by the base station 10-1, but the UE 20-1 may change the mapping information.

3. Second Embodiment

In the foregoing, the first embodiment of the present disclosure has been described. Subsequently, the second embodiment of the present disclosure will be described. UE 20-2 according to the second embodiment of the present disclosure selects a random access resource that transmits a preamble in accordance with the value of transmission data. Accordingly, the base station 10-1 having received the preamble can determine transmission data from the random access resource through which the preamble is received.

3-1. Configuration of UE in Second Embodiment

Figure 14:
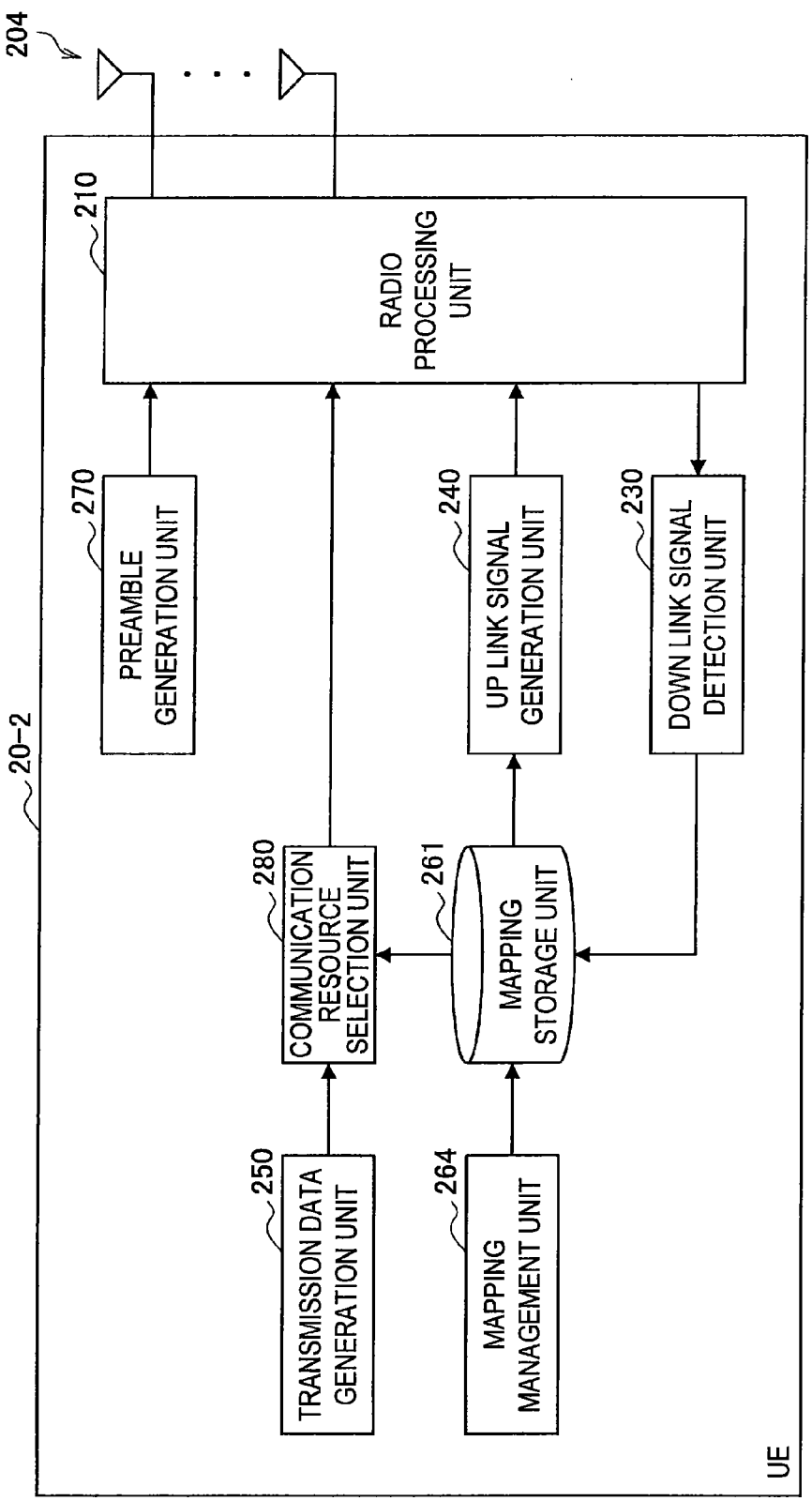
FIG. 14 is a functional block diagram showing the configuration of UE according to a second embodiment of the present disclosure.

FIG. 14 is a functional block diagram showing the configuration of the UE 20-2 according to the second embodiment of the present disclosure. As shown in FIG. 14, the UE 20-2 according to the second embodiment of the present disclosure includes the antenna group 204, the radio processing unit 210, the down link signal detection unit 230, the up link signal detection unit 240, the transmission data generation unit 250, a mapping storage unit 261, the mapping management unit 264, the preamble generation unit 270, and a communication resource selection unit 280. The antenna group 204, the radio processing unit 210, the down link signal detection unit 230, the up link signal detection unit 240, and the transmission data generation unit 250 are as described in the first embodiment and thus, a detailed description thereof here is omitted.

The mapping storage unit 261 according to the second embodiment stores mapping information (second mapping information) showing the correspondences between data and random access resources. Like the first embodiment, the mapping information is shared between a base station 10-2 and the UE 20-2. Incidentally, a plurality of the UE 20-1 present in the same cell may hold the same mapping information or different mapping information. The mapping information will be described more concretely below with reference to FIG. 15.

FIG. 15 is an explanatory view showing a concrete example of mapping information showing correspondences between data and random access resources. As shown in FIG. 15, the mapping information defines a correspondence between each piece of 10-bit data "0000000000" to "1111111111" and one SFN of SFN 0 to SFN 1023. For example, data "0000000010" is associated with SFN 2. SFN is, as described with reference to FIG. 5, a serial number attached to each radio frame of 10 ms. In LTE, the bandwidth of 1.08 MHz corresponding to six resource blocks of random access resources used for transmission of a preamble is occupied only for transmission of a Zadoff Chu sequence to realize initial access of an up link. Thus, causing the UE 20-2 to perform, for example, random access a plurality of times successively for the purpose of transmitting user data is an enormous waste of radio resources and is desirably avoided. In this respect, according to the method in the second embodiment, only mapping between SFN and data is defined and thus, there is practically no concern about a waste of radio resources.

The communication resource selection unit 280 selects the random access resource corresponding to the transmission data generated by the transmission data generation unit 250 based on mapping information stored in the mapping storage unit 261. If, for example, the transmission data is "0000000010", the communication resource selection unit 280 selects SFN 2 associated with "0000000010".

The radio processing unit 210 transmits the preamble generated by the preamble generation unit 270 by the specified subframe in SFN selected by the communication resource selection unit 280. Accordingly, the base station 10-2 having received the preamble can determine the transmission data based on SFN where the preamble is received.

(Supplementary Remarks)

The number of bits of transmission data that can be represented by the UE 20-2 through the selection of random access resources changes depending on the PRACH configuration index value allocated to the UE 20-2. For example, as shown in FIG. 5, the PRACH configuration index values "0", "1", "2", and "15" specify only even SFN as random access resources. Thus, the UE 20-2 to which "0", "1", "2", or "15" is allocated can represent 9 bits from 0 to 511 through the selection of random access resources. Mapping information of the UE 20-2 to which "0", "1", "2", or "15" is allocated may define correspondences between 9-bit data from 0 to 511 and even SFN.

On the other hand, as shown in FIG. 5, the PRACH configuration index values "3" to "5" specify all SFN as random access resources. Thus, the UE 20-2 to which one of "3" to "5" is allocated can represent 10 bits from 0 to 1023 through the selection of random access resources. Mapping information of the UE 20-2 to which one of "3" to "5" is allocated may define correspondences between 10-bit data from 0 to 1023 and any SFN of SFN 0 to 1023.

Also, as shown in FIG. 5, the PRACH configuration index values "6" to "14" specify a plurality of subframes in all SFN as random access resources. Thus, the UE 20-2 to which one of "6" to "14" is allocated can represent data of integral multiples of 10 bits through the selection of random access resources. Mapping information of the UE 20-2 to which one of "6" to "14" is allocated may define correspondences between data of 11 bits or more and any SFN and subframes thereof.

Further, when a plurality of random access resources is arranged on the frequency in the same time slot, still higher bits can be represented. For example, the UE 20-2 to which "14" is allocated can represent 10 bits through the selection of SFN and 3 and 4 bits through the selection of subframes and thus, data of the total of nearly 20 bits can be represented if the degree of freedom in the frequency direction is taken into account.

(Application Example)

Examples of extending transmission data through the degree of freedom of the selection of subframes in SFN or the degree of freedom of the selection of frequency are described above, but transmission data can also be extended by other methods. As one of such other methods, a method of defining a super system frame for each of a predetermined number of radio frames of 10 ms can be cited. The method will be described more concretely below with reference to FIG. 16.

Figure 16:
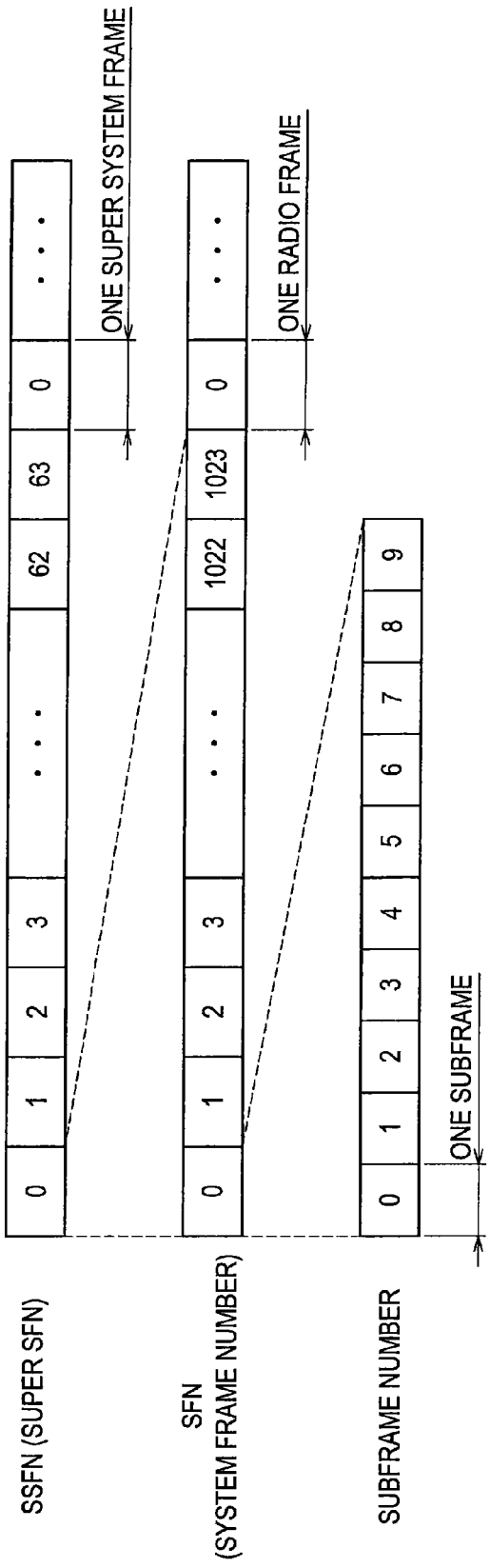
FIG. 16 is an explanatory view showing the relationship among a subframe, a radio frame, and a super system frame.

FIG. 16 is an explanatory view showing the relationship among a subframe, a radio frame, and a super system frame. In the example shown in FIG. 16, one super system frame is formed of 1023 radio frames and one period of super system frame numbers is 0 to 63. In this case, the UE 20-2 can communicate additional G-bit data due to the degree of freedom of the selection of super system frames.

Selecting random access resources in accordance with transmission data as described above could lead to randomness of preamble transmission timing. Thus, the second embodiment may be considered to be useful for eliminating a PRACH overload of MTC terminals when widespread use of MTC terminals is achieved.

If, for example, a super system frame is defined as shown in FIG. 16, one super system frame is 10.24 s and thus, one period of the super system frames is about 655 s, namely. about 11 min. Therefore, when the super system frame shown in FIG. 16 is defined, the transmission timing of a preamble can be dispersed throughout about 11 min. By configuring the super frame in this manner, the number of bits may be decided based on a delay time desired in MTC because there is a trade-off relationship between the delay time of data and the number of bits of data that can be transmitted. The technology according to the present disclosure is not necessarily intended to eliminate an overload, but if the super frame is configured as described above, the super frame is expected to be effective particularly in avoiding RAN congestion. Therefore, the technology according to the present disclosure may also be used for the above purpose, in addition to information communication by the super frame.

3-2. Configuration of Base Station According to Second Embodiment

In the foregoing, the configuration of the UE 20-2 according to the second embodiment of the present disclosure has been described. Subsequently, the configuration of the base station 10-2 according to the second embodiment of the present disclosure will be described with reference to FIG. 17.

Figure 17:
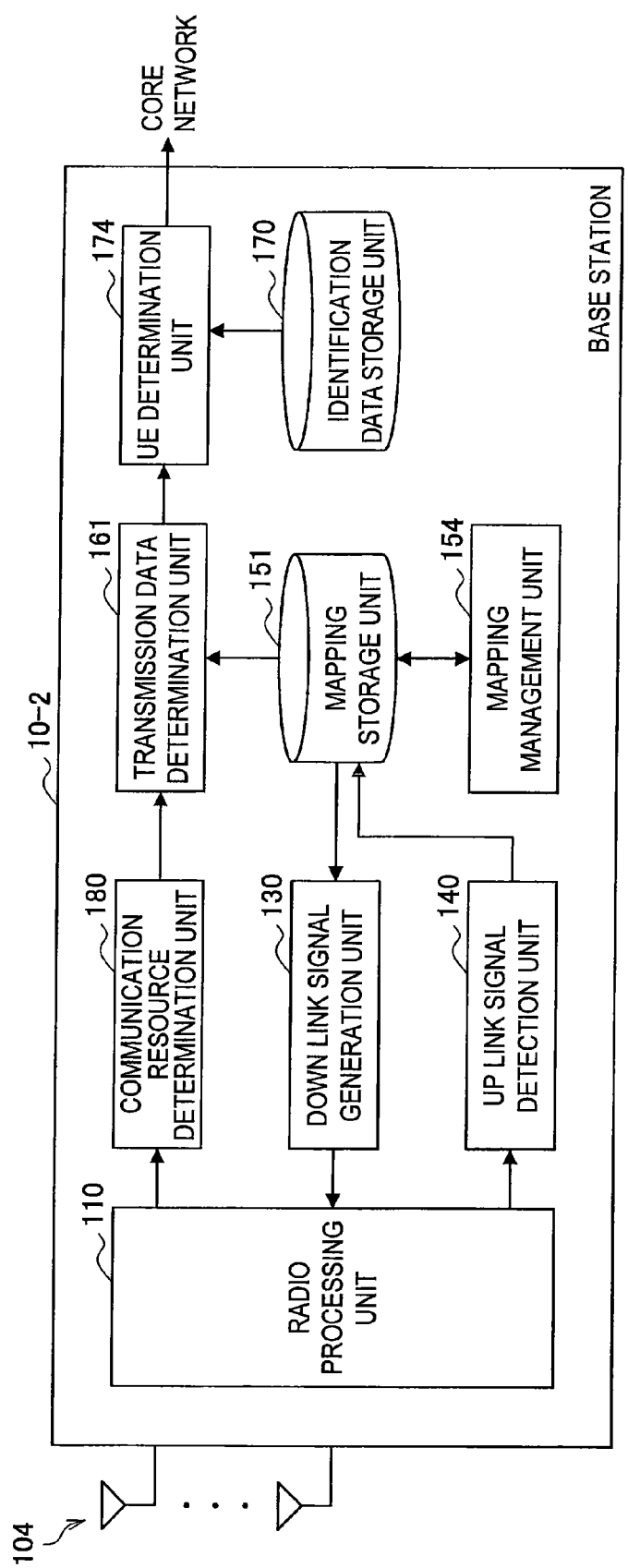
FIG. 17 is a functional block diagram showing the configuration of a base station according to the second embodiment of the present disclosure.

FIG. 17 is a functional block diagram showing the configuration of the base station 10-2 according to the second embodiment of the present disclosure. As shown in FIG. 17, the base station 10-2 according to the second embodiment includes the antenna group 104, the radio processing unit 110, the down link signal generation unit 130, the up link signal detection unit 140, a mapping storage unit 151, the mapping management unit 154, a transmission data determination unit 161, the identification data storage unit 170, the UE determination unit 174, and a communication resource determination unit 180. The antenna group 104, the radio processing unit 110, the down link signal generation unit 130, the up link signal detection unit 140, and the like are as described in the first embodiment and thus, a detailed description thereof here is omitted.

The mapping storage unit 151 stores, like the mapping storage unit 261 of the UE 20-2, mapping information showing the correspondences between data and random access resources.

The communication resource determination unit 180 determines the random access resource through which a preamble is received by the radio processing unit 110. For example, the communication resource determination unit 180 determines the super system frame number, SFN, and the subframe number of the random access resource through which a preamble is received.

The transmission data determination unit 161 determines transmission data corresponding to the random access resource determined by the communication resource determination unit 180 based on mapping information stored in the mapping storage unit 151. If, for example, the random access resource determined by the communication resource determination unit 180 is SFN 2, the transmission data determination unit 161 determines that the transmission data is "0000000010" based on, for example, mapping information shown in FIG. 15.

3-3. Operation in Second Embodiment

In the foregoing, the configurations of the base station 10-2 and the UE 20-2 according to the second embodiment of the present disclosure have been described. Subsequently, the operation according to the second embodiment of the present disclosure will be described with reference to FIG. 18.

Figure 18:
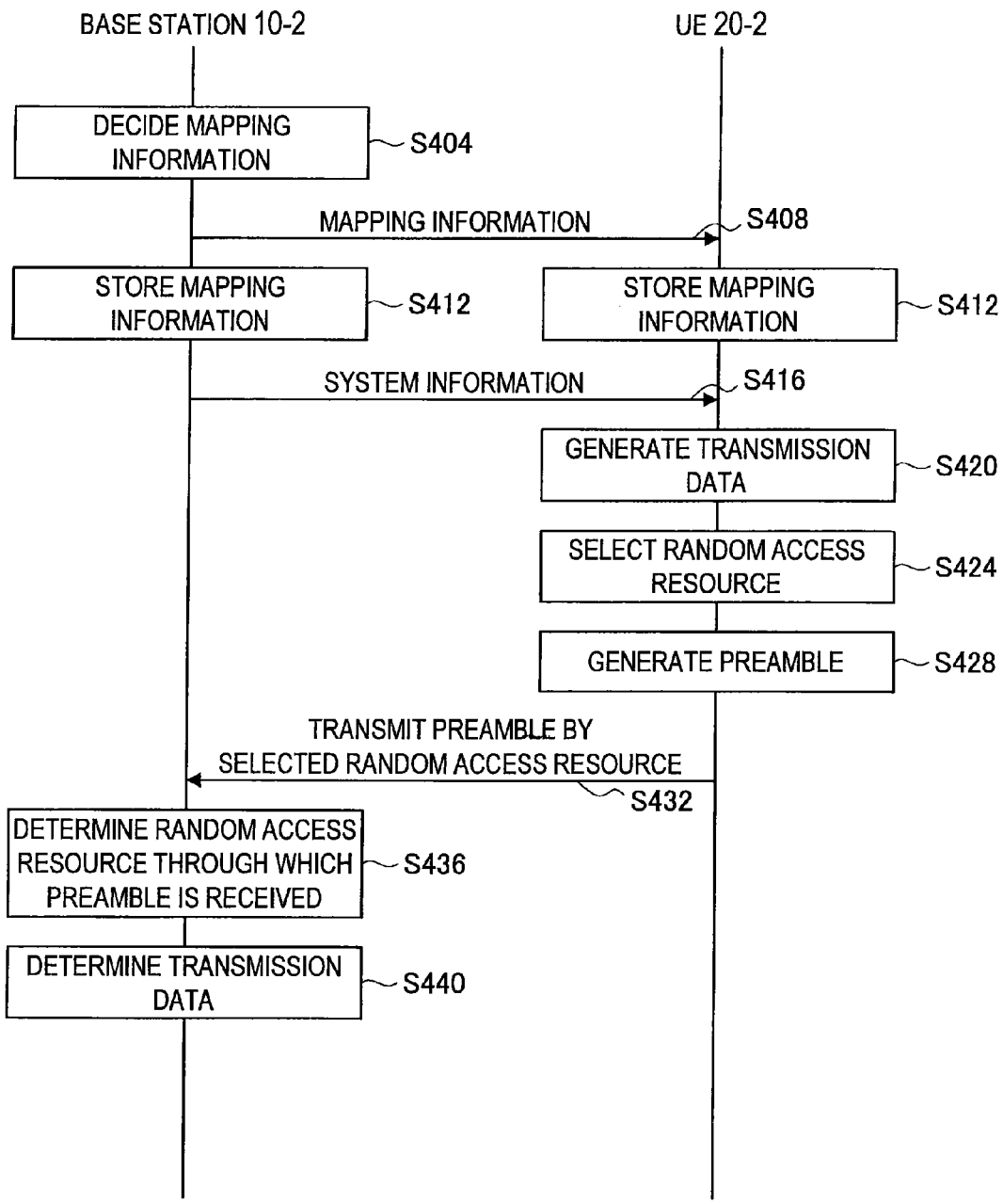
FIG. 18 is a sequence diagram tidying up operations according to the second embodiment of the present disclosure.

FIG. 18 is a sequence diagram tidying up operations according to the second embodiment of the present disclosure. As shown in FIG. 18, when the mapping management unit 154 of the base station 10-2 first decides mapping information (S404), the base station 10-2 signals the decided mapping information to the UE 20-2 (S408). Then, the base station 10-2 and the UE 20-2 store the mapping information in the mapping storage unit 151 and the mapping storage unit 161 respectively (S412).

Then, after the base station 10-2 communicates system information (S416), the transmission data generation unit 250 of the UE 20-2 generates transmission data (S420) and then the communication resource selection unit 280 selects the random access resource corresponding to the transmission data (S424). Subsequently, the preamble generation unit 270 selects any one signature from 64 signatures and uses the selected signature to generate a preamble (S428). Further, the radio processing unit 210 and the antenna group 204 transmit the preamble to the base station 10-1 using the selected random access resource (S432).

On the other hand, when the preamble is received from the UE 20-2, the base station 10-2 determines the random access resource through which the preamble is received (S436). Then, the transmission data determination unit 161 of the base station 10-1 determines the transmission data corresponding to the determined random access resource based on mapping data (S440). Thereafter, the determined transmission data is transmitted to, for example, a predetermined operator via the core network 12.

If the reception of the preamble is successful, the base station 10-2 may transmit, like the normal random access procedure, a random access response. In this case, the UE 20-2 can recognize that the transmission data has normally been transmitted to the base station 10-2 based on the reception of the random access response from the base station 10-2. On the other hand, after receiving the random access response, the UE 20-2 may not continue with the random access procedure including the transmission of an L2/L3 message. By adopting such a configuration, the UE 20-2 can transmit data to the base station 10-1 only by transmission of a preamble and therefore, power consumption and an occurrence of RAN overload can be inhibited.

4. Third Embodiment

In the foregoing, the second embodiment of the present disclosure has been described. Subsequently, the third embodiment of the present disclosure will be described. According to the third embodiment of the present disclosure, large-capacity data communication using a preamble can be realized by combining the selection of the signature according to the first embodiment and the selection of the random access resource according to the second embodiment.

4-1. Configuration of UE in Third Embodiment

Figure 19:
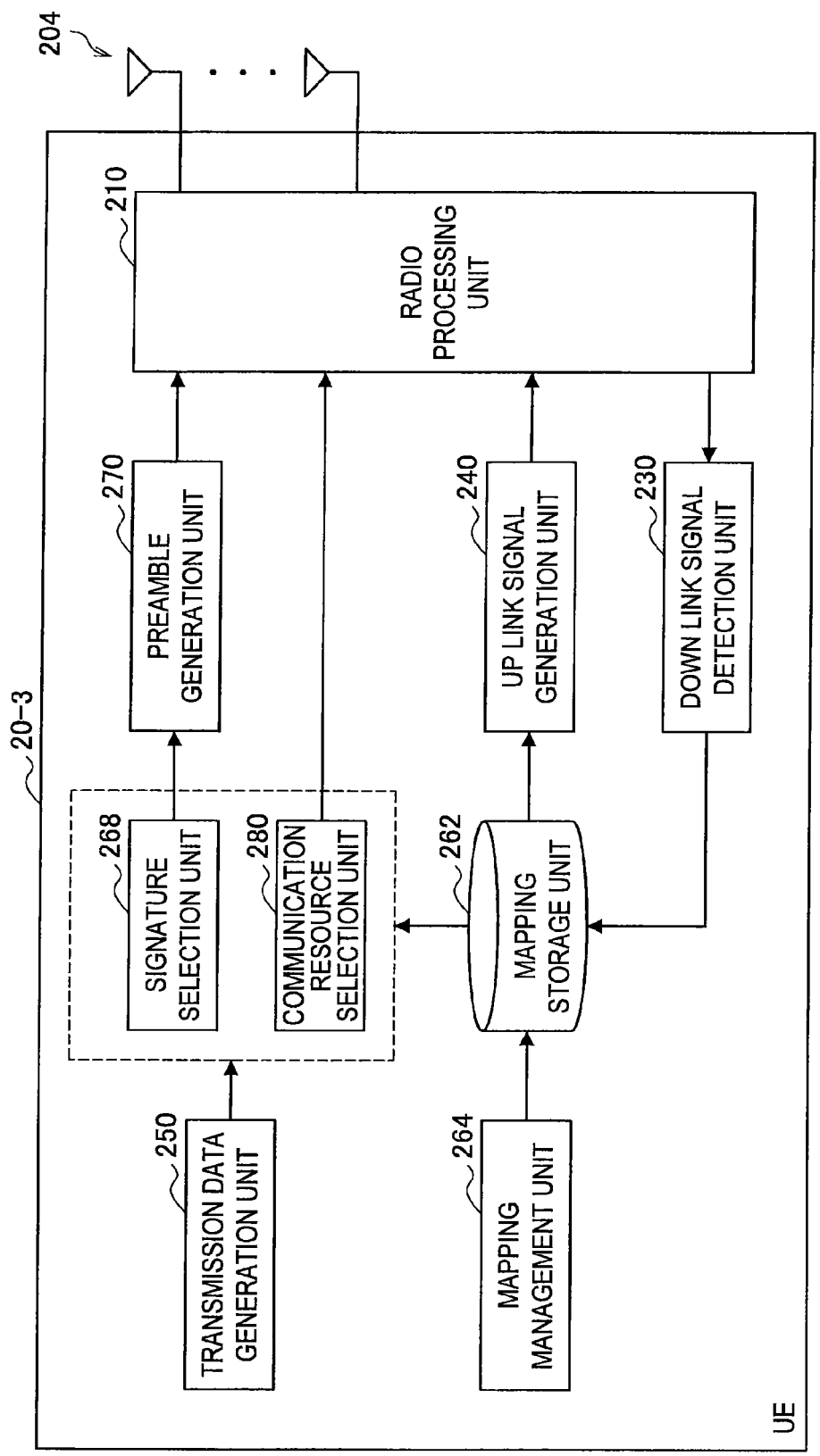
FIG. 19 is a functional block diagram showing the configuration of UE according to a third embodiment of the present disclosure.

FIG. 19 is a functional block diagram showing the configuration of UE 20-3 according to the third embodiment of the present disclosure. As shown in FIG. 19, the UE 20-3 according to the third embodiment of the present disclosure includes the antenna group 204, the radio processing unit 210, the down link signal detection unit 230, the up link signal detection unit 240, the transmission data generation unit 250, a mapping storage unit 262, the mapping management unit 264, the signature selection unit 268, the preamble generation unit 270, and the communication resource selection unit 280. The antenna group 204, the radio processing unit 210, the down link signal detection unit 230, the up link signal detection unit 240, and the transmission data generation unit 250 are as described in the first embodiment and thus, a detailed description thereof here is omitted.

The mapping storage unit 262 according to the third embodiment stores mapping information showing the correspondences between data and signatures described in the first embodiment and mapping information showing the correspondences between data and random access resources described in the second embodiment. Further, the mapping storage unit 262 according to the third embodiment stores third mapping information showing the bit position used for the selection of the signature in transmission data and the bit position used for the selection of the random access resource in transmission data. Like the other mapping information, the third mapping information is also shared between the UE 20-3 and the base station 10-3 and the mapping storage unit 262 functions as first to third storage units. The third mapping information will be described more concretely below with reference to FIG. 20.

Figure 20:
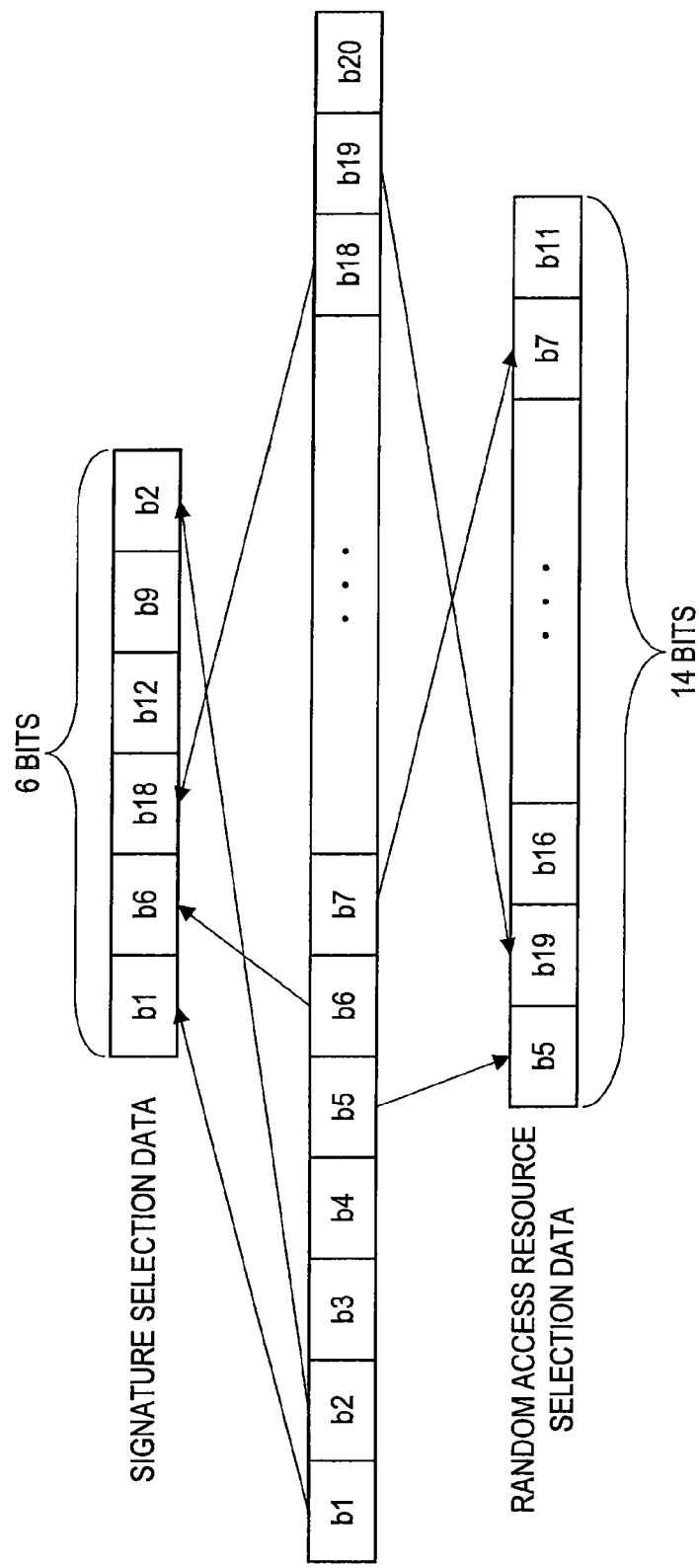
FIG. 20 is an explanatory view showing signature selection data and random access resource selection data obtained by dividing transmission data.

FIG. 20 is an explanatory view showing signature selection data and random access resource selection data obtained by dividing transmission data. When, as shown in FIG. 20, transmission data is formed of 20 bits of bits b1 to b20, the third mapping information defines 6 bits used for signature selection of 20 bits and 14 bits used for random access resource selection. In the example shown in FIG. 20, bits b1, b6, b18, b12, b9, b2 are defined as signature selection data and bits b5, b19, b16, . . . , b7, b11 are defined as random access resource selection data.

Thus, when the signature selection according to the first embodiment and the random access resource selection according to the second embodiment are combined, confidentiality of transmission data can be improved by irregularly dividing transmission data into signature selection data and random access resource selection data. The UE 20-3 or the base station 10-3 can further improve confidentiality of transmission data by changing the third mapping information when appropriate, that is, by changing the bit position or the bit order used for each use.

The signature selection unit 268 identifies the signature selection data from the transmission data generated by the transmission data generation unit 250 by referring to the third mapping information stored in the mapping storage unit 262. Then, the signature selection unit 268 selects the signature corresponding to the identified signature selection data based on mapping information stored in the mapping storage unit 262 and showing the correspondences between data and signatures. The preamble generation unit 270 generates a preamble using the signature selected by the signature selection unit 268.

The communication resource selection unit 280 identifies the random access resource selection data from the transmission data generated by the transmission data generation unit 250 by referring to the third mapping information stored in the mapping storage unit 262. Then, the communication resource selection unit 280 selects the random access resource corresponding to the identified random access resource selection data based on mapping information stored in the mapping storage unit 262 and showing the correspondences between data and random access resources.

The radio processing unit 210 transmits the preamble generated by the preamble generation unit 270 by the random access resource selected by the communication resource selection unit 280. Accordingly, the base station 10-3 can determine transmission data based on the signature of the preamble and the random access resource through which the preamble is received.

4-2. Configuration of Base Station According to Third Embodiment

Subsequently, the configuration of the base station 10-3 according to the third embodiment of the present disclosure will be described with reference to FIG. 21.

Figure 21:
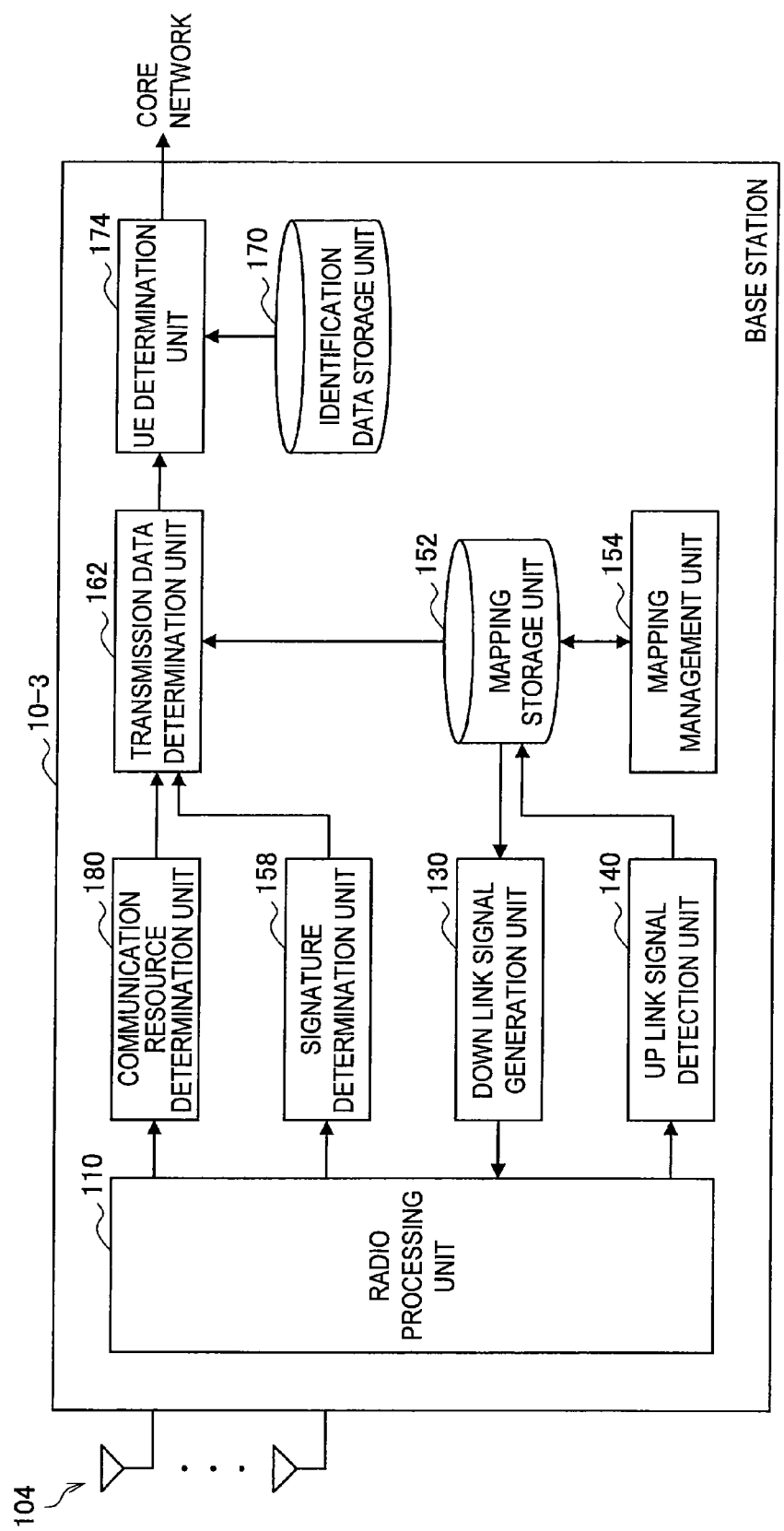
FIG. 21 is a functional block diagram showing the configuration of a base station according to the third embodiment of the present disclosure.

FIG. 21 is a functional block diagram showing the configuration of the base station 10-3 according to the third embodiment of the present disclosure. As shown in FIG. 21, the base station 10-3 according to the third embodiment includes the antenna group 104, the radio processing unit 110, the down link signal generation unit 130, the up link signal detection unit 140, a mapping storage unit 152, the mapping management unit 154, the signature determination unit 158, a transmission data determination unit 162, the identification data storage unit 170, the UE determination unit 174, and the communication resource determination unit 180. The antenna group 104, the radio processing unit 110, the down link signal detection unit 130, the up link signal detection unit 140, and the like are as described in the first embodiment and thus, a detailed description thereof here is omitted.

The mapping storage unit 152 stores mapping information showing the correspondences between data and signatures described in the first embodiment and mapping information showing the correspondences between data and random access resources described in the second embodiment. Further, the mapping storage unit 152 stores third mapping information showing the bit position used for the selection of the signature in transmission data and the bit position used for the selection of the random access resource in transmission data. The mapping storage unit 152 functions as first to third storage units.

The signature selection unit 158 determines the signature of a preamble received by the radio processing unit 110 from a correlation output value.

The communication resource determination unit 180 determines the random access resource through which a preamble is received by the radio processing unit 110. For example, the communication resource determination unit 180 determines the super system frame number, SFN, and the subframe number of the random access resource through which a preamble is received.

The transmission data determination unit 162 determines data corresponding to the signature determined by the signature determination unit 158 based on mapping information stored in the mapping storage unit 152 and showing the correspondences between data and signatures. Also, the transmission data determination unit 162 determines data corresponding to the random access resource determined by the communication resource determination unit 180 based on mapping information stored in the mapping storage unit 152 and showing the correspondences between data and random access resources.

Further, the transmission data determination unit 162 determines transmission data by combining data determined by the signature determination unit 158 and data determined by the communication resource determination unit 180 based on third mapping information stored in the mapping storage unit 153.

4-3. Operation in Third Embodiment

In the foregoing, the configurations of the base station 10-3 and the UE 20-3 according to the third embodiment of the present disclosure have been described. Subsequently, the operation according to the third embodiment of the present disclosure will be described with reference to FIG. 22.

FIG. 22 is a sequence diagram tidying up operations according to the third embodiment of the present disclosure. As shown in FIG. 22, when the mapping management unit 154 of the base station 10-3 first decides three kinds of mapping information (S504), the base station 10-3 signals the decided three kinds of mapping information to the UE 20-3 (S508). Then, the base station 10-3 and the UE 20-3 store the three kinds of mapping information in the mapping storage unit 152 and the mapping storage unit 162 respectively (S512).

Then, after the base station 10-3 communicates system information (S516), the transmission data generation unit 250 of the UE 20-3 generates transmission data (S520) and then the communication resource selection unit 280 selects the random access resource corresponding to the transmission data (S524). Also, the signature selection unit 268 selects the signature corresponding to the transmission data (S528). The preamble generation unit 270 generates a preamble using the signature selected by the signature selection unit 268 (S532). Further, the radio processing unit 210 and the antenna group 204 transmit the preamble generated by the preamble generation unit 270 by the random access resource selected by the communication resource selection unit 280 (S536).

On the other hand, when the preamble is received from the UE 20-3, the base station 10-3 determines the random access resource through which the preamble is received (S540). Also, the signature determination unit 158 of the base station 10-3 determines the signature of the preamble (S544). Then, the transmission data determination unit 162 of the base station 10-3 determines transmission data by determining data corresponding to the determined signature and data corresponding to the determined random access resource and combining the data (S548). Thereafter, the determined transmission data is transmitted to, for example, a predetermined operator via the core network 12.

According to the third embodiment of the present disclosure, as described above, large-capacity data communication using a preamble can be realized by combining the selection of the signature according to the first embodiment and the selection of the random access resource according to the second embodiment.

4-4. Modifications

Subsequently, some modifications of the aforementioned embodiments will be described.

(First Modification)

In general, sign bits for cyclic redundancy checks (CRC) to determine whether data is correctly communicated to the receiving side are attached to the transmission data. Also from the viewpoint of data confidentiality, data is frequently transmitted after being encrypted.

Encryption of data in LTE is performed by, like in 3G generating a random number called a key stream by using a secret key K shared between USIM of a terminal and a network authentication center and operating exclusive OR (XOR) of data and the key stream. The key stream is intended for one-time use and the secret key K is changed when necessary.

More specifically, LTE has two encryption algorithms called Snow 3G and AES as standardized algorithms. Snow 3G is performed in 32-bit units and AES is performed in 128-bit units.

Thus, if the bit length that can be communicated by preamble transmission at a time should be 20 bits, it is difficult to communicate encrypted data encrypted by using an encryption algorithm like the above one by preamble transmission at a time. Thus, as a first modification, a technique to divide encrypted data into a plurality of pieces of transmission data and transmit a preamble a plurality of times is proposed. The technique will be described more concretely below with reference to FIG. 23.

FIG. 23 is an explanatory view showing the division of encrypted data. When, as shown in FIG. 23, 32-bit encrypted data containing E1 to E32 is generated, the transmission data generation unit 250 may divide the transmission data into first transmission data containing E1 to E16 and second transmission data containing E17 to E32. In addition, the first transmission data and second transmission data may contain associated data C1 to C4 indicating association of the first transmission data with the second transmission data. By adopting such a configuration, encrypted data containing E1 to E32 can be obtained by combining the first transmission data and the second transmission data in the base station 10-3.

When AES (128 bits) is used, the transmission data generation unit 250 may buffer data until 128 bits are reached and perform block encryption after the data reaches 128 bits to divide 128-bit encrypted data into eight pieces of transmission data. The encryption key used for such encryption is delivered in advance on a secure down communication path.

(Second Modification)

In the third embodiment, an example of representing transmission data by the selection of the signature and the selection of the random access resource is described, but transmission data may be represented by one of the selection of the signature and the selection of the random access resource. In this case, the transmission data generation unit 250 may add a flag indicating which of the signature and the random access resource corresponds to transmission data to the transmission data. By adopting such a configuration, the base station 10-3 can judge on which of the signature and the random access resource the determination of transmission data should be based.

(Third Modification)

The base station 10-3 may specify the time slot in which transmission of transmission data by transmitting a preamble is permitted through system information. For example, the base station 10-3 may permit the transmission by specifying a predetermined interval like a 30-min interval or 1-hour interval or may permit the transmission at the end of a month or in a specific time slot. In such a case, the UE 20-3 performs the transmission only in the time slot specified by the base station 10-3.

5. Summary

As described above, the UE 20-1 according to the first embodiment of the present disclosure selects the signature of a preamble in accordance with the value of transmission data. Accordingly, the base station 10-1 having received the preamble can determine transmission data from the signature of the preamble.

The UE 20-2 according to the second embodiment of the present disclosure selects the random access resource that transmits a preamble in accordance with the value of transmission data. Accordingly, the base station 10-1 having received the preamble can determine transmission data from the random access resource through which the preamble is received.

Further, the UE 20-3 according to the third embodiment of the present disclosure can realize data communication of a larger capacity using a preamble by combining the selection of the signature according to the first embodiment and the selection of the random access resource according to the second embodiment.

According to each embodiment of the present disclosure, as described above, data transmission can be realized by transmitting a preamble and therefore, power consumption of the UE 20 can significantly be reduced and also an occurrence of RAN overload can be inhibited.

The preferred embodiments of the present disclosure have been described above in detail with reference to the accompanying drawings, but the technical scope of the present disclosure is not limited to the above examples. A person skilled in the art may find various alterations and modifications within the scope of the appended claims, and it should be understood that they will naturally come under the technical scope of the present disclosure.

For example, each step of processing in the base station 10 and the UE 20 herein does not necessarily need to be performed chronologically in the order described as a sequence diagram. For example, each step of processing in the base station 10 and the UE 20 may be performed in an order different from the order described as a sequence diagram or in parallel.

Also, a computer program causing hardware such as a CPU, ROM, RAM and the like contained in the base station 10 or the UE 20 to function on a par with each configuration of the base station 10 or the UE 20 described above. In addition, a storage medium in which the computer program is stored is provided.

Additionally, the present technology may also be configured as below.

(1)
A communication apparatus including:
   a signature selection unit that selects one signature from a plurality of signatures; and
   a preamble generation unit that generates a preamble in random access using the signature selected by the signature selection unit,
   wherein the signature selection unit selects the signature corresponding to a value of transmission data.

(2)
The communication apparatus according to (1), further including:
   a resource selection unit that selects, for transmission of the preamble, a communication resource corresponding to the value of the transmission data.

(3)
The communication apparatus according to (2), wherein the value of the transmission is represented by a selection of the communication resource by the resource selection unit and the selection of the signature by the signature selection unit.

(4)
The communication apparatus according to any one of (2) or (3), further including:
   a first storage unit that stores first mapping information showing correspondences between a plurality of the signatures and data,
   wherein the signature selection unit selects the signature corresponding to the value of the transmission data by referring to the first mapping information.

(5)
The communication apparatus according to any one of (2) to (4), further including:
   a second storage unit that stores second mapping information showing correspondences between a plurality of the communication resources and data,
   wherein the resource selection unit selects the communication resource corresponding to the value of the transmission data by referring to the second mapping information.

(6)
The communication apparatus according to any one of (2) to (5), further including:
   a third storage unit that stores third mapping information showing a position of a bit used for selecting the signature and a bit used for selecting the communication resource in the transmission data.

(7)
The communication apparatus according to (6), wherein the first mapping information to the third mapping information are shared with a base station as a transmission destination of the preamble.

(8)
The communication apparatus according to (7), further including:
   a transmitting unit that transmits at least one of the first mapping information to the third mapping information to the base station.

(9)
The communication apparatus according to (7), further including:
   a receiving unit that receives at least one of the first mapping information to the third mapping information from the base station.

(10)
The communication apparatus according to (6), further including:
   a mapping changing unit that changes at least one of the first mapping information to the third mapping information.

(11)
The communication apparatus according to any one of (2) to (10), wherein one of the signature selection unit and the resource selection unit selects one of the signature and the communication resource that are corresponding to the value of the transmission data in a specified time slot.

(12)
The communication apparatus according to any one of (1) to (11), further including:
   a transmission data generation unit that generates a plurality of pieces of the transmission data by dividing target data into a plurality of pieces of division data,
   wherein the transmission data contains the division data and association data showing association with other transmission data generated from the target data.

(13)
The communication apparatus according to (2) to (12),
   wherein a super system frame is formed from a predetermined number of radio frames defined in LTE, and
   wherein the resource selection unit selects the communication resource corresponding to the value of the transmission data from a range of a plurality of the super system frames.

(14)
The communication apparatus according to (1) to (13), wherein the transmission data contains identification data of the communication apparatus.

(15)
The communication apparatus according to any one of (1) to (14), wherein the transmission data contains encrypted data.

(16)
A communication method including:
   selecting one signature from a plurality of signatures; and
   generating a preamble in random access by using the selected signature,
   wherein selecting the signature includes selecting the signature corresponding to a value of transmission data.

(17)
A communication system including:
   a communication apparatus including
      a signature selection unit that selects one signature from a plurality of signatures, and
      a preamble generation unit that generates a preamble in random access using the signature selected by the signature selection unit, the signature selection unit selecting the signature corresponding to a value of transmission data; and
   a base station that determines the transmission data based on the signature of the preamble received from the communication apparatus.

(18)
A base station including:
   a receiving unit that receives a preamble from a communication apparatus that generates the preamble in random access using a signature corresponding to a value of transmission data; and a data determination unit that determines the transmission data based on the signature of the preamble.

(19) A communication method including:
receiving a preamble from a communication apparatus that generates the preamble in random access using a signature corresponding to a value of transmission data; and
determining the transmission data based on the signature of the preamble.

REFERENCE SIGNS LIST 10 base station
12 core network
20 UE
150, 151, 152, 160, 161, 162 mapping storage unit
154, 264 mapping management unit
158 signature determination unit
160, 161, 162 transmission data determination unit
180 communication resource determination unit
250 transmission data generation unit
268 signature selection unit
270 preamble generation unit
280 communication resource selection unit

The invention claimed is:

1. A communication apparatus comprising:
a transmission data generation unit configured to generate transmission data to be transmitted;
a signature selection unit configured to select one signature from a plurality of signatures; and
a preamble generation unit configured to generate a preamble in random access using the signature selected by the signature selection unit,
wherein the signature selection unit is configured to select the signature based on a position of one or more bits of the transmission data to be used for the signature selection.

2. The communication apparatus according to claim 1, further comprising:
a resource selection unit configured to select, for transmission of the preamble, a communication resource based on the one or more bits of the transmission data.

3. The communication apparatus according to claim 2, wherein the one or more bits of the transmission data is represented by a selection of the communication resource by the resource selection unit and the selection of the signature by the signature selection unit.

4. The communication apparatus according to claim 2, further comprising:
a first storage unit configured to store first mapping information showing correspondences between a plurality of the signatures and data,
wherein the signature selection unit is configured to select the signature corresponding to the one or more bits of the transmission data by referring to the first mapping information.

5. The communication apparatus according to claim 2, further comprising:
a second storage unit configured to store second mapping information showing correspondences between a plurality of the communication resources and data,
wherein the resource selection unit selects the communication resource corresponding to the one or more bits of the transmission data by referring to the second mapping information.

6. The communication apparatus according to claim 2, further comprising:
a third storage unit configured to store third mapping information showing a position of a first set of one or more bits used for selecting the signature and a second set of one or more bits used for selecting the communication resource in the transmission data,
wherein the first set of one or more bits is different from the second set of one or more bits.

7. The communication apparatus according to claim 6, wherein first mapping information showing correspondences between a plurality of the signatures and data, second mapping information showing correspondences between a plurality of the communication resources and the data, and the third mapping information are shared with a base station as a transmission destination of the preamble.

8. The communication apparatus according to claim 7, further comprising:
a transmitting unit configured to transmit at least one of the first mapping information, the second mapping information and the third mapping information to the base station.

9. The communication apparatus according to claim 7, further comprising:
a receiving unit configured to receive at least one of the first mapping information, the second mapping information and the third mapping information from the base station.

10. The communication apparatus according to claim 7, further comprising:
a mapping changing unit configured to change at least one of the first mapping information, the second mapping information and the third mapping information.

11. The communication apparatus according to claim 2, wherein one of the signature selection unit and the resource selection unit is configured to select one of the signature and the communication resource that are corresponding to the one or more bits of the transmission data in a specified time slot.

12. The communication apparatus according to claim 1, wherein the transmission data generation unit is configured to generate a plurality of pieces of the transmission data by dividing target data into a plurality of pieces of division data,
wherein each of the plurality of pieces of the transmission data contains the division data and association data, and
wherein the association data of one of the plurality of pieces of the transmission data shows an association of the one of the plurality of pieces of the transmission data with other transmission data generated from the target data.

13. The communication apparatus according to claim 2, wherein a super system frame is formed from a predetermined number of radio frames defined in LTE, and
wherein the resource selection unit is configured to select the communication resource corresponding to the one or more bits of the transmission data from a range of a plurality of the super system frames.

14. The communication apparatus according to claim 1, wherein the transmission data contains identification data of the communication apparatus.

15. The communication apparatus according to claim 1, wherein the transmission data contains encrypted data.

16. A communication method comprising:
generating transmission data to be transmitted;
selecting one signature from a plurality of signatures; and generating a preamble in random access by using the selected signature, wherein selecting the signature includes selecting the signature based on a position of one or more bits of the transmission data to be used for the signature selection.

17. A communication system comprising:
a communication apparatus including:
- a transmission data generation unit configured to generate transmission data to be transmitted;
- a signature selection unit configured to select one signature from a plurality of signatures; and
- a preamble generation unit configured to generate a preamble in random access using the signature selected by the signature selection unit, the signature selection unit selecting the signature based on a position of one or more bits of the transmission data to be used for the signature selection; and a base station configured to determine the transmission data based on the signature of the preamble received from the communication apparatus.

18. A base station comprising:
a receiving unit configured to receive a preamble from a communication apparatus configured to generate the preamble in random access using a signature selected based on a position of one or more bits of transmission data to be used for the signature selection, wherein the transmission data is generated in the communication apparatus; and a data determination unit configured to determine the transmission data based on the signature of the preamble.

19. A communication method comprising:
receiving a preamble from a communication apparatus configured to generate the preamble in random access using a signature selected based on a position of one or more bits of transmission data to be used for the signature selection, wherein the transmission data is generated in the communication apparatus; and determining the transmission data based on the signature of the preamble.

20. The communication apparatus according to claim 1, wherein the signature selection unit is configured to select the signature based on the position of each the one or more bits and an order of the one or more bits defined for the signature selection.

* * * * *